US012203375B2

(12) United States Patent
Hardikar et al.

(10) Patent No.: US 12,203,375 B2
(45) Date of Patent: Jan. 21, 2025

(54) SEAL ASSEMBLIES FOR TURBINE ENGINES HAVING WEAR DETECTION FEATURES

(71) Applicant: General Electric Company, Schenectady, NY (US)

(72) Inventors: Narendra Anand Hardikar, Bengaluru (IN); Deepak Trivedi, Halfmoon, NY (US); Ravindra Shankar Ganiger, Bengaluru (IN); Scott Alan Schimmels, Miamisburg, OH (US); Kevin Richard Graziano, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 81 days.

(21) Appl. No.: 17/871,063

(22) Filed: Jul. 22, 2022

(65) Prior Publication Data

US 2024/0026799 A1 Jan. 25, 2024

(51) Int. Cl.
*F01D 11/02* (2006.01)
*F01D 11/12* (2006.01)

(52) U.S. Cl.
CPC .............. *F01D 11/02* (2013.01); *F01D 11/12* (2013.01); *F05D 2220/30* (2013.01); *F05D 2240/55* (2013.01); *F05D 2260/80* (2013.01)

(58) Field of Classification Search
CPC ........ F01D 11/02; F01D 11/12; F01D 21/003; F05D 2220/30; F05D 2240/55; F05D 2260/80; F16J 15/444
See application file for complete search history.

(56) References Cited

U.S. PATENT DOCUMENTS

| | | | |
|---|---|---|---|
| 4,478,082 | A | 10/1984 | Sato et al. |
| 5,975,537 | A | 11/1999 | Turnquist et al. |
| 6,758,477 | B2 | 7/2004 | Brauer et al. |
| 7,409,319 | B2 | 8/2008 | Kant et al. |
| 8,115,494 | B2 | 2/2012 | Franklin |
| 8,682,563 | B2 | 3/2014 | Malcolmson et al. |
| 9,645,038 | B2 | 5/2017 | Bird |
| 9,683,454 | B1 | 6/2017 | Welch et al. |
| 10,385,976 | B2 | 8/2019 | Kurth et al. |
| 2003/0184022 | A1 | 10/2003 | Brauer et al. |
| 2003/0185669 | A1 | 10/2003 | Brauer et al. |

(Continued)

FOREIGN PATENT DOCUMENTS

| | | | | |
|---|---|---|---|---|
| FR | 3091549 A1 * | 7/2020 | ............... C09D 5/29 |
| GB | 2449709 A * | 12/2008 | ............ F01D 11/122 |
| WO | WO8912160 A1 | 12/1989 | |

*Primary Examiner* — Woody A Lee, Jr.
*Assistant Examiner* — Jesse M Prager
(74) *Attorney, Agent, or Firm* — Dority & Manning, P.A.

(57) ABSTRACT

A seal assembly at a rotor-stator interface includes at least one non-contacting seal interface and at least one rub detection feature. The rub detection feature(s) is configured to generate a signal upon the rotor and the stator making contact at the rotor-stator interface and causing wear above a certain threshold at the rotor-stator interface. The seal assembly also includes at least one sensor arranged at the rotor-stator interface. The sensor is configured to sense the signal. The seal assembly further includes a controller communicatively coupled with the sensor(s). The controller is configured to receive the signal and estimate at least one of an amount and a location of the wear at the rotor-stator interface based on the signal.

18 Claims, 13 Drawing Sheets

(56) References Cited

U.S. PATENT DOCUMENTS

| | | | | |
|---|---|---|---|---|
| 2005/0287386 | A1* | 12/2005 | Sabol | F01D 17/02 73/776 |
| 2012/0251290 | A1 | 10/2012 | Turnquist et al. | |
| 2018/0252117 | A1* | 9/2018 | Warren | F01D 11/025 |
| 2018/0347389 | A1* | 12/2018 | Prenger | F01D 11/003 |
| 2019/0040759 | A1* | 2/2019 | Warren | F01D 21/003 |
| 2021/0404348 | A1 | 12/2021 | Buonvino et al. | |
| 2022/0065121 | A1* | 3/2022 | Schwendenmann | F01D 25/183 |

* cited by examiner

SEAL ASSEMBLIES FOR TURBINE ENGINES HAVING WEAR DETECTION FEATURES

FIELD

The present disclosure generally relates to seal assemblies for rotary machines, and more particularly, to seal assemblies for gas turbine engines.

BACKGROUND

Gas turbine engines generally include a turbine section downstream of a combustion section that is rotatable with a compressor section to rotate and operate the gas turbine engine to generate power, such as propulsive thrust. Typically, the turbine section defines a high pressure turbine in serial flow arrangement with an intermediate pressure turbine and/or low pressure turbine. The high pressure turbine includes an inlet or nozzle guide vane between the combustion section and the high pressure turbine rotor. The nozzle guide vane generally serves to accelerate a flow of combustion gases exiting the combustion section to more closely match or exceed the high pressure turbine rotor speed along a tangential or circumferential direction. Thereafter, turbine sections generally include successive rows or stages of stationary and rotating airfoils, or vanes and blades, respectively.

In addition, rotary machines, such as gas turbine engines, have seals between rotating components (e.g., rotors) and corresponding stationary components (e.g., stators). These seals may help to reduce leakage of fluids between the rotors and stators. These seals may additionally or alternatively help separate fluids that have respectively different pressures and/or temperatures. The sealing properties of a seal may impact not only the amount of leakage and/or separation of fluids, but also the overall operation and/or operating efficiency of the rotary machine.

An example seal in a gas turbine engine is a non-contacting film riding aspirating face seal (AFS) of the rotor. However, during high vibration, stalls, and/or high thermal gradients (such as burst chop re-burst or high maneuvers), the AFS air bearing can experience metal-to-metal contact between the rotor and the stator, thereby causing rubs and air bearing wear. This may change the seal force balance, thereby causing the seal to run tighter, which can lead to more rubs and wear. Moreover, metal-to-metal contact can generate high heat and temperature rise and potentially initiate cracks that may propagate through the rotor.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
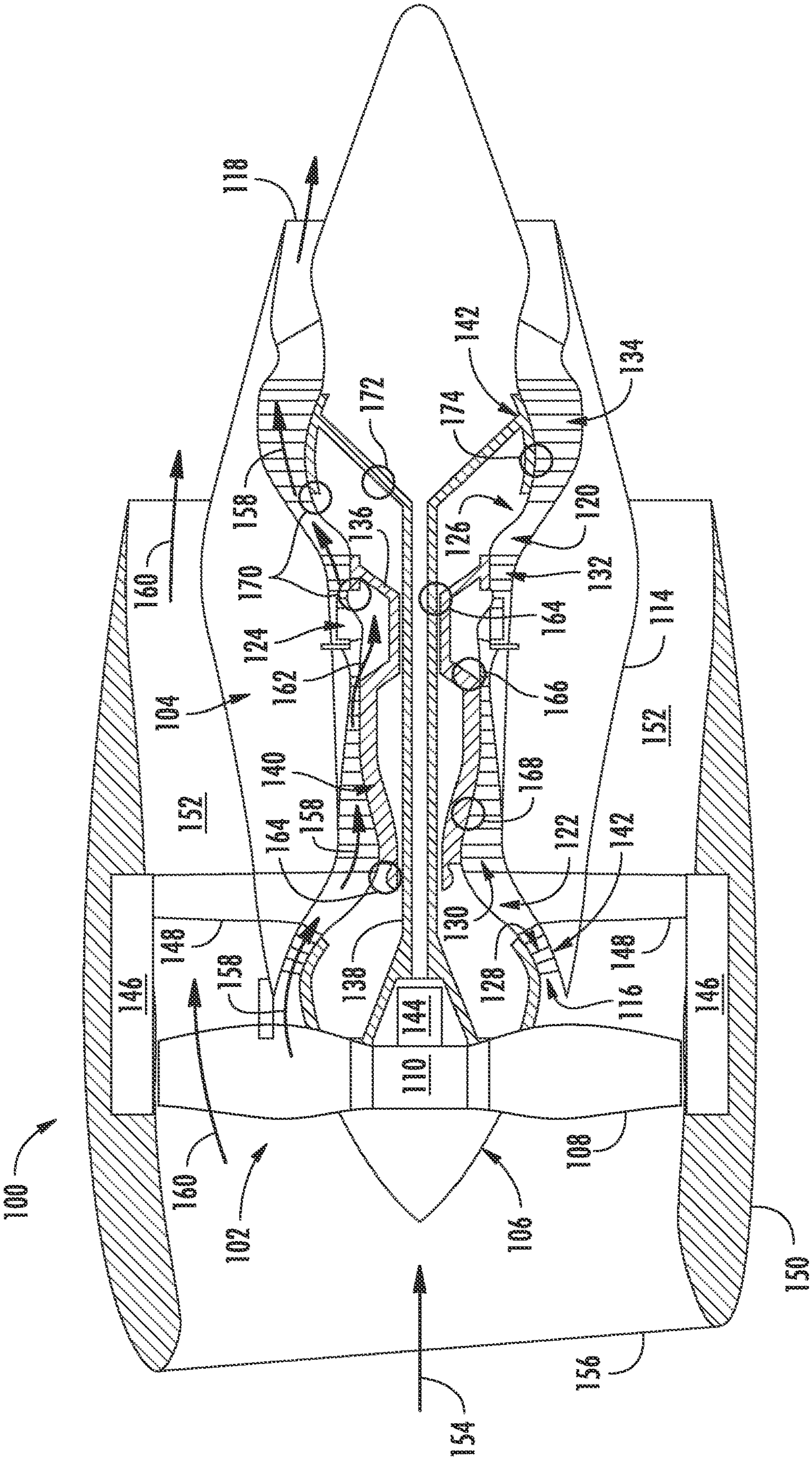
FIG. 1 shows a schematic cross-sectional view of an exemplary rotary machine that includes a gas turbine engine according to embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term “combustion section” refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term “rotor” refers to any component of a rotary machine, such as a turbine engine, that rotates about an axis of rotation. By way of example, a rotor may include a shaft or a spool of a rotary machine, such as a turbine engine.

As used herein, the term “stator” refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms “low” and “high”, or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a “high turbine” or “high speed turbine” of the engine.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

As used herein, the terms “axial” and “axially” refer to directions and orientations that extend substantially parallel to a centerline of the gas turbine engine. Moreover, the terms “radial” and “radially” refer to directions and orientations that extend substantially perpendicular to the centerline of the gas turbine engine. In addition, as used herein, the terms “circumferential” and “circumferentially” refer to directions and orientations that extend arcuately about the centerline of the gas turbine engine.

The terms “coupled”, “fixed”, “attached to”, and the like refer to both direct coupling, fixing, or attaching, as well as indirect coupling, fixing, or attaching through one or more intermediate components or features, unless otherwise specified herein.

As used herein, the terms “first”, “second”, “third” and so on may be used interchangeably to distinguish one component from another and are not intended to signify location or importance of the individual components.

The term “adjacent” as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms “integral”, “unitary”, or “monolithic” as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally provides seal assemblies for rotary machines. The presently disclosed seal assemblies may be utilized in any rotary machine. Exemplary embodiments may be particularly suitable for turbomachines, such as turbine engines, and the like. The presently disclosed seal assemblies include aspirating seals that provide a thin film of fluid between a face of the seal and a face of the rotor. The thin film of fluid may be provided by a one or more aspiration conduits that allow fluid, such as pressurized air or gasses within a turbine engine to flow from a higher-pressure region on one side of the seal assembly to a lower-pressure region on another side of the seal assembly. The fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, an aerodynamic bearing or a combination of aerostatic and aerodynamic features referred to as a hybrid bearing, or the like.

As such, the presently disclosed seal assemblies are generally considered to be non-contacting seals, in that the fluid bearing inhibits contact between the seal face and the rotor face. In particular, the presently disclosed seal assemblies generally include a primary seal defined by a rotor face of a seal rotor and a slider face of a seal slider. The primary seal may be configured as an aspirating face seal, a fluid bearing, a gas bearing, or the like. In addition, or in the alternative, the primary seal may be configured as a radial film riding seal, an axial film riding seal, a radial carbon seal, an axial carbon seal, or the like.

However, for such seals, under high vibration, stalls, and/or high thermal gradients, the non-contacting components can come into contact with each other, thereby causing metal-to-metal rubs and air bearing wear. This may change the seal force balance and may also cause the seal to run tighter, which causes more wear. Hence, rub detection and health monitoring of air bearing surfaces are helpful for seal robustness.

Accordingly, the seal assembly of the present disclosure generally includes certain rub detection features and related control logic that enables in-flight rub detection of the seal assembly, i.e., without requiring disassembly of the rotary machine to view damage/wear. In particular, the rub detection feature(s) may include a plurality of blind holes on the rotor. In such embodiments, the blind holes become exposed when wear occurs beyond a certain threshold and create a signal that can be detected by a sensor placed on stator.

Exemplary embodiments of the present disclosure will now be described in further detail. Referring to FIG. 1, an exemplary turbine engine 100 will be described. The exemplary turbine engine 100 may be mounted to an aircraft, such as in an under-wing configuration or tail-mounted configuration. It will be appreciated that the turbine engine 100 shown in FIG. 1 is provided by way of example and not to be limiting, and that the subject matter of the present disclosure may be implemented with other types of turbine engines, as well as other types of rotary machines.

In general, the turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The core engine 104 may be coupled directly or indirectly to the fan section 102 to provide torque for driving the fan section 102.

The core engine 104 may include an engine case 114 that encases one or more portions of the core engine 104, including, a compressor section 122, a combustion section 124, and a turbine section 126. The engine case 114 may define a core engine-inlet 116, an exhaust nozzle 118, and a core air flowpath 120 therebetween. The core air flowpath 120 may pass through the compressor section 122, the combustion section 124, and the turbine section 126, in serial flow relationship. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, combustion section 124, turbine section 126, and exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130. The LP shaft 138 may drivingly connect the LP turbine 134 to the LP compressor 128. In other embodiments, a turbine engine may have three shafts, such as in the case of a turbine engine that includes an intermediate pressure turbine. A shaft of the core engine 104, together with a rotating portion of the core engine 104, may sometimes be referred to as a "spool." The HP shaft 136, a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, and a rotating portion of the LP turbine 134 coupled to the LP shaft 138, may be collectively referred to as low pressure (LP) spool 142.

In some embodiments, the fan section 102 may be coupled directly to a shaft of the core engine 104, such as directly to an LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150. The nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or the inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as a nose cowl of the nacelle 150. The inlet airflow 154 passes across the fan blades 108. The inlet airflow 154 splits into a core airflow 158 that flows into and through the core air flowpath 120 of the core engine 104 and a bypass airflow 160 that flows through the bypass passage 152. The core airflow 158 is compressed by the compressor section 122. Pressurized air from the compressor section 122 flows downstream to the combustion section 124 where fuel is introduced to generate combustion gasses, as represented by arrow 162. The combustion gasses exit the combustion section 124 and flow through the turbine section 126, generating torque that rotates the compressor section 122 to support combustion while also rotating the fan section 102. Rotation of the fan section 102 causes the bypass airflow 160 to flow through the bypass passage 152, generating propulsive thrust. Additional thrust is generated by the core airflow 158 exiting the exhaust nozzle 118.

In some exemplary embodiments, the turbine engine 100 may be a relatively large power class turbine engine 100 that may generate a relatively large amount of thrust when operated at the rated speed. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein. For example, the present disclosure may be implemented in aircrafts as well as non-aircraft applications.

Still referring to FIG. 1, the turbine engine 100 includes seal assemblies at a number of locations throughout the turbine engine 100, any one or more of which may be configured according to the present disclosure. A presently disclosed seal assembly may be provided in a turbine engine 100 at any location that includes an interface with a rotating portion of the turbine engine 100, such as an interface with a rotating portion or spool of the core engine 104. For example, a seal assembly may be included at an interface with a portion of the LP spool 142 and/or at an interface with the HP spool 140. In some embodiments, a seal assembly may be included at an interface between a spool, such as the LP spool 142 or the HP spool 140, a stationary portion of the core engine 104. Additionally, or in the alternative, a seal assembly may be included at an interface between the LP spool 142 and the HP spool 140. Additionally, or in the alternative, a seal assembly may be included at an interface between a stationary portion of the core engine 104 and the LP shaft 138 or the HP shaft 136, and/or at an interface between the LP shaft 138 and the HP shaft 136.

By way of example, FIG. 1 shows some exemplary locations of a seal assembly. Such seal assemblies may be particularly suited, for example, at a rotor-stator interface 201 as described herein and illustrated in FIG. 2A. As an example, a seal assembly may be located at or near a bearing compartment 164. A seal assembly located at or near the bearing compartment 164 may sometimes be referred to as a bearing compartment seal. Such a bearing compartment seal may be configured to inhibit air flow, such as core airflow 158 from passing into a bearing compartment of the turbine engine 100, such as a bearing compartment located at an interface between the LP shaft 138 and the HP shaft 136.

As another example, a seal assembly may be located at or near the compressor section 122 of the turbine engine 100. In some embodiments, a seal assembly may be located at or near a compressor discharge 166, for example, of the HP compressor 130. A seal assembly located at or near the compressor discharge 166 may sometimes be referred to as a compressor discharge pressure seal. Such a compressor discharge pressure seal may be configured to maintain pressure downstream of the compressor section 122 and/or to provide bearing thrust balance. Additionally, or in the alternative, a seal assembly may be located between adjacent compressor stages 168 of the compressor section 122. A seal assembly located between adjacent compressor stages 168 may be sometimes referred to as a compressor interstage seal. Such a compressor interstage seal may be configured to limit air recirculation within the compressor section 122.

As another example, a seal assembly may be located at or near the turbine section 126 of the turbine engine 100. In some embodiments, a seal assembly may be located at or near a turbine inlet 170, for example, of the HP turbine 132 or the LP turbine 134. A seal assembly located at or near a turbine inlet 170 may sometimes be referred to as a forward turbine seal. Such a forward turbine seal may be configured to contain high-pressure cooling air for the HP turbine 132 and/or the LP turbine 134, such as for turbine disks and turbine blades thereof. Additionally, or in the alternative, a seal assembly may be located at or near one or more turbine disk rims 172. A seal assembly located at or near a turbine disk rim 172 may sometimes be referred to as a turbine disk rim seal. Such a turbine disk rim seal may be configured to inhibit hot gas ingestion into the disk rim area. Additionally, or in the alternative, a seal assembly may be located between adjacent turbine stages 174 of the turbine section 126. A seal assembly located between adjacent turbine stages 174 may be sometimes referred to as a turbine interstage seal. Such a turbine interstage seal may be configured to limit air recirculation within the turbine section 126.

A seal assembly at any one or more of these locations or other location of a turbine engine 100 may be configured in accordance with the present disclosure. Additionally, or in the alternative, the turbine engine 100 may include a presently disclosed seal assembly at one or more other locations of the turbine engine 100. It will also be appreciated that the presently disclosed seal assemblies may also be used in other rotary machines, and that the turbine engine 100 described with reference to FIG. 1 is provided by way of example and not to be limiting.

Figure 2A:
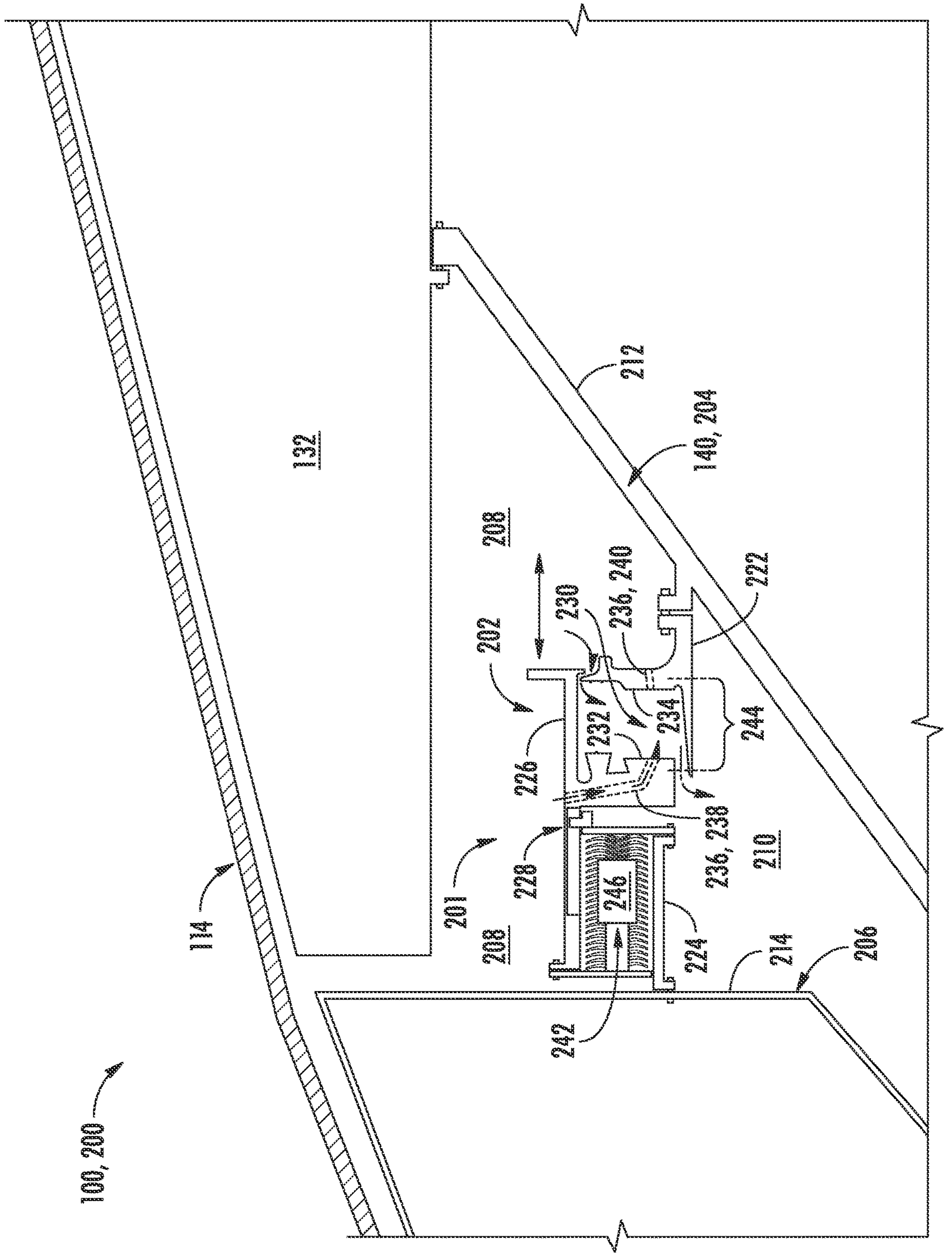
FIGS. 2A and 2B respectively show schematic perspective views of an exemplary seal assembly disposed adjacent to a rotor a turbine engine according to embodiments of the present disclosure.
Figure 2B:
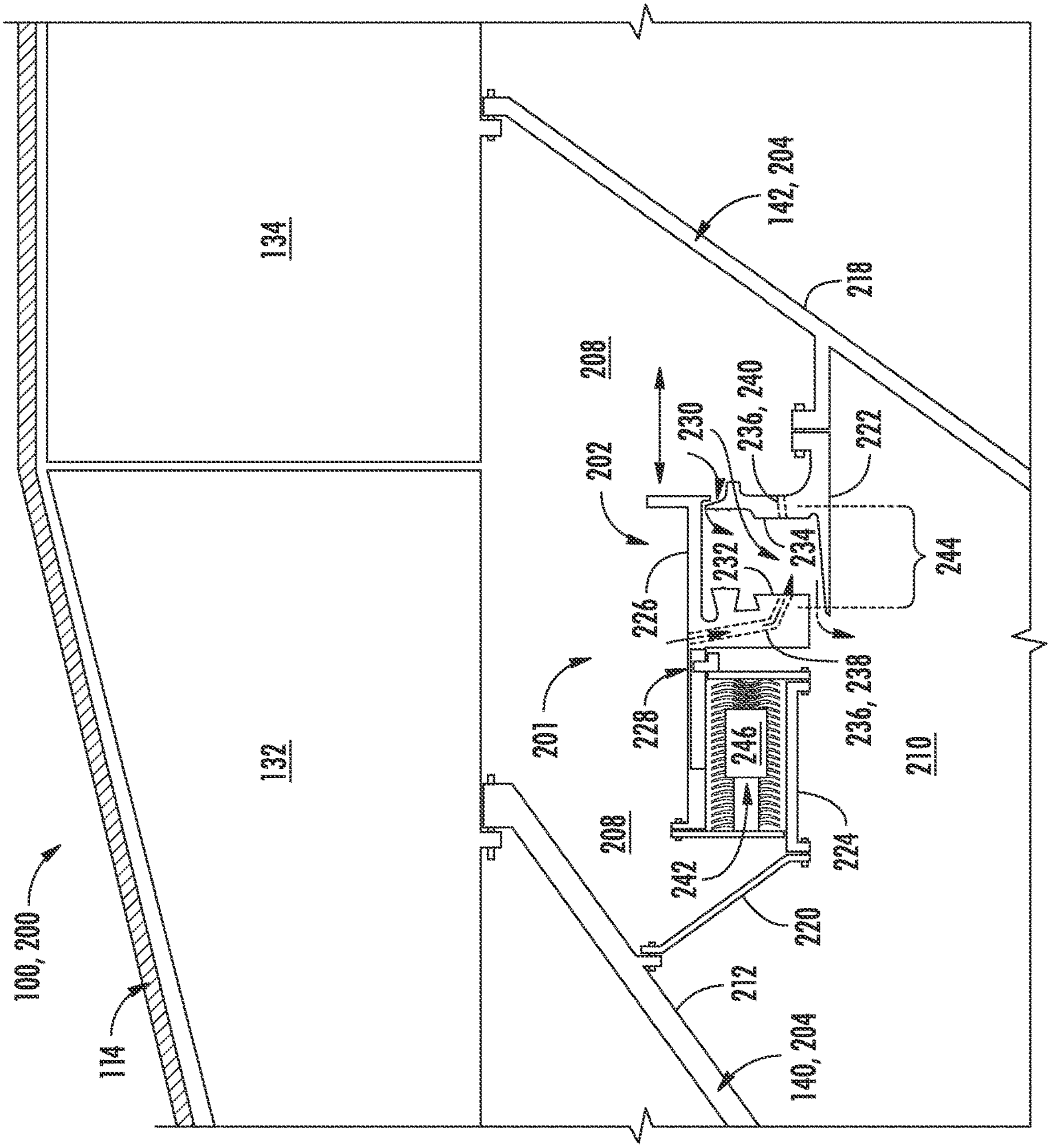

Now referring to FIGS. 2A-2B, exemplary seal assemblies are further described. As shown, a rotary machine 200, such as a turbine engine 100, may include a seal assembly 202 configured to provide a seal interface with a rotor 204, such as between a rotor 204 and a stator 206 of a rotary machine 200. The seal assembly 202 may be integrated into any rotary machine 200, such as a turbine engine 100 as described with reference to FIG. 1. As shown in FIG. 2A, the seal assembly 202 may separate an inlet plenum 208 from an outlet plenum 210. The inlet plenum 208 may define a region of the rotary machine 200 that includes a relatively higher-pressure fluid volume. The outlet plenum 210 may define a region of the rotary machine 200 that includes a relatively lower-pressure fluid volume. The seal assembly 202 may have an annular configuration. In some embodiments, the seal assembly 202 may include a plurality of annular elements that may be assembled to provide the seal assembly 202. Additionally, or in the alternative, the seal assembly 202 may include a plurality of semi-annular elements that may be assembled to provide the seal assembly 202 that has an annular configuration.

In some embodiments, as shown, for example, in FIG. 2A, a seal assembly 202 may provide a seal interface between an HP spool 140 and a stationary portion of the core engine 104. For example, the rotor 204 may include a portion of an HP spool 140. Additionally, or in the alternative, the rotor 204 may include an HP spool cone 212 that defines a portion of the HP spool 140. In some embodiments, the stator 206 may include a turbine center frame 214. The seal assembly 202 may provide a seal interface between the HP spool cone 212 and the turbine center frame 214. Additionally, or in the alternative, in some embodiments, as shown, for example, in FIG. 2B, a seal assembly 202 may provide a seal interface between rotating bodies, such as between an HP spool 140 and the LP spool 142. The rotor 204 may include a portion of an LP spool 142. For example, the rotor 204 may include an LP spool cone 218 that defines a portion of the LP spool 142. Additionally, or in the alternative, the seal assembly 202 may be coupled to the HP spool cone 212. For example, the seal stator 224 may be coupled to the HP spool 140, such as to the HP spool cone 212. The seal rotor 222 may be coupled to the LP spool 142, such as to the LP spool cone 218. The seal assembly 202 may define a seal interface between the HP spool cone 212 and the LP spool cone 218. In some embodiments, an inner extension 220 may couple the seal assembly 202 to the HP spool cone 212.

The seal assembly 202 may be configured as an aspirating seal that provides a non-contacting seal interface that inhibits contact between the seal stator 224 and a seal slider 226. By way of example, the seal assembly 202 may include or may be configured as an aspirating face seal, a fluid bearing, a gas bearing, or the like. During operation, a fluid within the inlet plenum 208 may flow, e.g., aspirate, through one or more pathways of the seal assembly 202 to the outlet plenum 210. The fluid flow may provide for the non-contacting seal interface. In some embodiments, the fluid may include pressurized air, gasses, and/or vapor. In other embodiments, the fluid may include a liquid.

Figure 8:
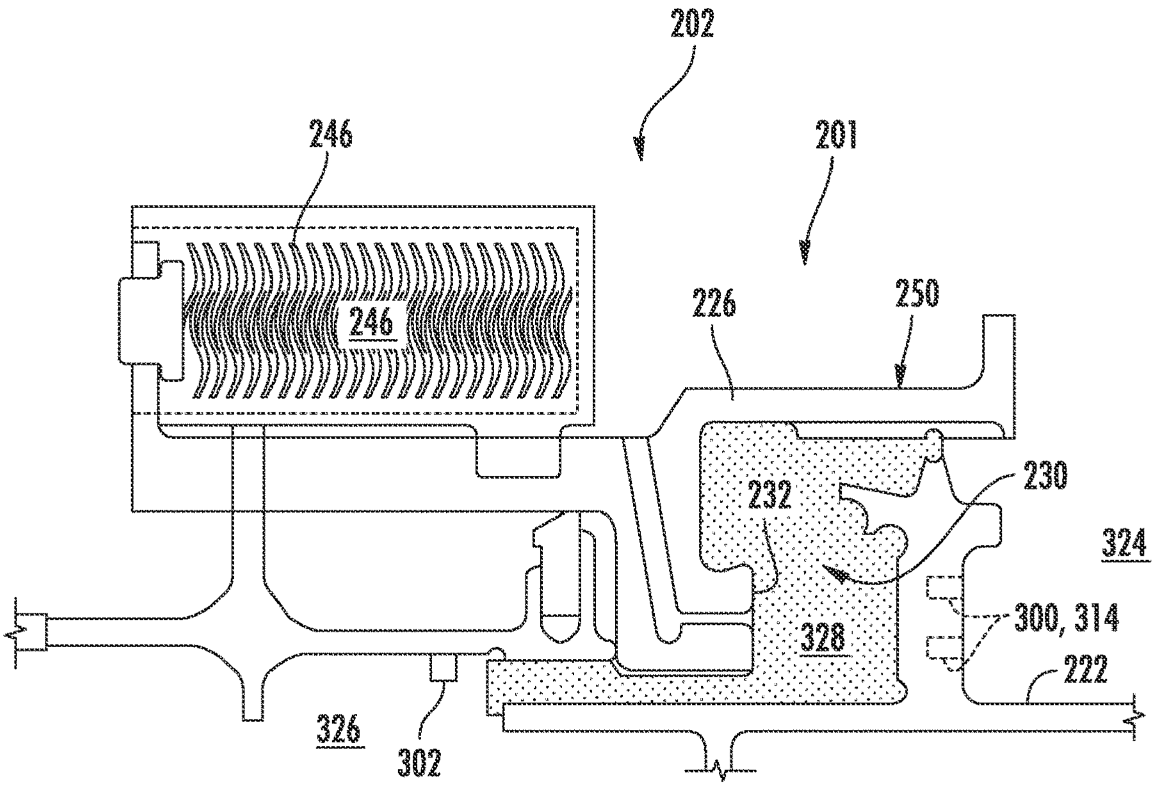
FIG. 8 shows a detailed, side view of an exemplary seal assembly according to the present disclosure, particularly illustrating a rotor face of the seal assembly having a plurality of blind holes formed therein during normal conditions according to embodiments of the present disclosure.

As shown, a seal assembly 202 may be disposed adjacent to the rotor 204. Further, as shown, the seal assembly 202 may include a seal rotor 222, a seal stator 224, and a seal slider 226. The seal rotor 222 may be coupled to the rotor 204, such as to an HP spool cone 212 or another portion of an HP spool 140, or such as to an LP spool cone 218 or other portion of an LP spool 142. In some embodiments, the seal stator 224 may be coupled to a stationary portion of the core engine 104, such as to a turbine center frame 214. In some embodiments, the seal stator 224 may be coupled to a rotating portion of the core engine 104, such as to the HP spool cone 212 or other portion of an HP spool 140, or such as to an LP spool cone 218 or other portion of an LP spool 142. Additionally, or in the alternative, the seal stator 224 may be coupled to an inner extension 220, as shown, for example, in FIG. 2B. The seal slider 226 may be slidably coupled to the seal stator 224 at a slide interface 228. The seal rotor 222, the seal stator 224, and/or the seal slider 226 may respectively have an annular configuration. Additionally, or in the alternative, the seal rotor 222, the seal stator 224, and/or the seal slider 226 may respectively include a plurality of semi-annular elements that may be assembled to provide an annular assembly. The seal assembly 202 may include a primary seal 230 having a seal cavity 328 (FIG. 8). The primary seal 230 may include or may be configured as an aspirating face seal, a fluid bearing, a gas bearing, or the like. The primary seal 230 may have an annular configuration defined by one or more annular or semi-annular components, such as the seal slider 226 and/or the seal rotor 222.

The seal slider 226 may include a slider face 232. The seal rotor 222 may include a rotor face 234. The primary seal 230 may be defined at least in part by the slider face 232 of the seal slider 226 and the rotor face 234 of the seal rotor 222. The slider face 232 and the rotor face 234 may provide a non-contacting interface that defines the aspirating face seal, fluid bearing, gas bearing, or the like, of the primary seal 230. The seal slider 226 may be configured to slidably engage and retract the slider face 232 with respect to the rotor face 234. In some embodiments, the seal assembly 202 may include a plurality of aspiration conduits 236 configured to supply fluid from the inlet plenum 208 to the primary seal 230. The plurality of aspiration conduits 236 may be defined by a monolithic structure of one or more components of the seal assembly 202.

In some embodiments, the seal slider 226 may include a plurality of aspiration conduits 236 configured to supply fluid from the inlet plenum 208 to the primary seal 230. The aspiration conduits 236 defined by the seal slider 226 may sometimes be referred to as slider-aspiration conduits 238. The slider-aspiration conduits 238 may define an internal conduit, pathway, or the like that passes through the seal slider 226. The slider-aspiration conduits 238 may fluidly communicate with the inlet plenum 208 and the primary seal 230. The slider-aspiration conduits 238 may discharge fluid from the inlet plenum 208 to the primary seal 230, for example, at a plurality of openings in the slider face 232.

Additionally, or in the alternative, the aspiration conduits 236 defined by the seal rotor 222 may sometimes be referred to as rotor-aspiration conduits 240. The rotor-aspiration conduits 240 may define an internal conduit, pathway, or the like that passes through the seal rotor 222. The rotor-aspiration conduits 240 may fluidly communicate with the inlet plenum 208 and the primary seal 230. The rotor-aspiration conduits 240 may discharge fluid from the inlet plenum 208 to the primary seal 230, for example, at a plurality of openings in the rotor face 234.

During operation, the seal slider 226 may slide forward and aft relative to the seal stator 224 and the seal rotor 222. Movement of the seal slider 226 may be initiated at least in part due to a pressure difference between the inlet plenum 208 and the outlet plenum 210. By way of example, FIGS.

2A and 2B show the seal slider 226 in a retracted position such that the primary seal 230 is relatively open. The seal slider 226 may occupy a retracted position, for example, when the rotary machine 200 operates at idle. As the power output and/or rotational speed increases, the seal slider 226 may slide forward towards the seal rotor 222, for example, as the pressure differential increases between the inlet plenum 208 and the outlet plenum 210. The seal slider 226 may occupy an engaged position, for example, when the rotary machine 200 operates at nominal operating conditions and/or at rated operating conditions. With the seal slider 226 is in an engaged position, the slider face 232 and the rotor face 234 come into close proximity, while fluid flow from the inlet plenum 208 to the outlet plenum 210, such as through the plurality of aspiration conduits 236 may define an aspirating face seal, a fluid bearing, a gas bearing, or the like, that provides a non-contacting interface between the slider face 232 and the rotor face 234.

The seal assembly 202 may include a secondary seal 242. The secondary seal 242 may have an annular configuration defined by one or more annular or semi-annular components. The secondary seal 242 may exhibit elasticity while compressing and rebounding, and/or while expanding and rebounding, over at least a portion of a range of motion of the seal slider 226. The secondary seal 242 may inhibit or prevent fluid from passing therethrough, such as from the inlet plenum 208 to the outlet plenum 210, for example, while allowing the seal slider 226 to slide forward and aft relative to the seal stator 224 and the seal rotor 222, such as between a retracted position and an engaged position, in accordance with operating conditions of the rotary machine 200.

In some embodiments, the secondary seal 242 may be configured to provide resistance to a compression load. At least a portion of the compression load upon the secondary seal 242 may be activated when the seal slider 226 moves forward towards the seal rotor 222. Additionally, or in the alternative, the secondary seal 242 may exhibit at least some preload, such as at least some compression preload. The secondary seal 242 may be configured to exhibit a force constant, such as under a compression load, configured at least in part to provide resistance to the compression load while exhibiting forward and/or aft displacement suitable for operation of the primary seal 230, such as under specified operating conditions of the rotary machine 200.

In some embodiments, in addition or in the alternative to a compression load, the secondary seal 242 may be configured to provide resistance to a tension load. At least a portion of the tension load upon the secondary seal 242 may be activated when the seal slider 226 moves forward towards the seal rotor 222. Additionally, or in the alternative, the secondary seal 242 may exhibit at least some preload, such as at least some tension preload. The secondary seal 242 may be configured to exhibit a force constant, such as under a tension load, configured at least in part to provide resistance to the tension load while exhibiting forward and/or aft displacement suitable for operation of the primary seal 230, such as under specified operating conditions of the rotary machine 200. The forward and aft displacement of the secondary seal 242 may include compression and/or expansion of one or more secondary sealing elements 246 of the secondary seal 242. The specified operating conditions of the rotary machine 200 may include, for example, at least one of: startup operating conditions, idle operating conditions, shutdown operating conditions, nominal operating conditions, transient operating conditions, and aberrant operating conditions. A force vector, such as a compression force vector, acting on the secondary seal 242 may impart a compression load sufficient to move the seal slider 226 towards the seal rotor 222 and/or to hold the seal slider 226 in a position, such as an engaged position, relative to the seal rotor 222.

Additionally, or in the alternative, a force vector, such as a tension force vector, acting on the secondary seal 242 may impart a tension load sufficient to move the seal slider 226 towards the seal rotor 222 and/or to hold the seal slider 226 in a position, such as an engaged position, relative to the seal rotor 222. The force vector may include at least a pressure difference between the inlet plenum 208 and the outlet plenum 210. The force vector acting on the secondary seal 242 may cause the seal slider 226 to occupy and/or maintain an engaged position relative to the seal rotor 222 such that the slider face 232 has a suitable distance from the rotor face 234 to provide an aspirating face seal, a fluid bearing, a gas bearing, or the like.

In some embodiments, resistance to a compression load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the compression load, retracting the seal slider 226 and/or holding the seal slider 226 in a retracted position. Additionally, or in the alternative, resistance to a tension load provided by the secondary seal 242 may retract the seal slider 226 away from the seal rotor 222 and/or hold the seal slider 226 in a retracted position relative to the seal rotor 222. The secondary seal 242 may exhibit a rebound force sufficient to overcome the tension load, retracting the seal slider 226 and/or holding the seal slider 226 in a retracted position. The force constant of the secondary seal 242 may overcome the compression force vector and/or the tension force vector acting upon the secondary seal 242, causing the seal slider 226 to occupy and/or maintain a retracted position relative to the seal rotor 222, for example, when the pressure difference between the inlet plenum 208 and the outlet plenum is below, or decreases below, a threshold value. The secondary seal 242 may retract and/or hold the seal slider 226 in a retracted position relative to the seal rotor 222 under specified operating conditions of the rotary machine 200, including, for example, at least one of: startup operating conditions, idle operating conditions, shutdown operating conditions, transient operating conditions, and aberrant operating conditions. In some embodiments, with the seal slider 226 occupying a retracted position relative to the seal rotor 222, the slider face 232 of the primary seal 230 may be sufficiently separated from the rotor face 234 of the seal rotor 222 to provide disengage the aspirating face seal, fluid bearing, gas bearing, or the like.

In some embodiments, the seal rotor 222 may move forward and aft relative to the seal slider 226 and/or the seal stator 224. The seal slider 226 may be configured to move forward and aft responsive to movement of the seal rotor 222. For example, forward and aft movements of the seal slider 226 may track forward and aft movements of the seal rotor 222. In some embodiments, a force vector acting upon the secondary seal 242 may include at least a force imparted by the seal rotor 222. Additionally, or in the alternative, the seal stator 224 may move forward and aft relative to the seal slider 226 and/or the seal rotor 222. The seal slider 226 may be configured to move forward and aft responsive to movement of the seal stator 224. For example, forward and aft movements of the seal slider 226 may track forward and aft movements of the seal stator 224. In some embodiments, a force vector acting upon the secondary seal 242 may include at least a force imparted by the seal stator 224.

During operation, the secondary seal 242 may move through various stages of compression and rebound, and/or tension and rebound, for example, responsive to variations in one or more force vectors acting upon the secondary seal 242. The variations in the one or more force vectors may include at least one of variations in a pressure difference between the inlet plenum 208 and the outlet plenum 210, movements of the seal rotor 222, and movements of the seal stator 224. The secondary seal 242 may exhibit responsiveness to such variations in the one or more force vectors sufficient to maintain the seal slider 226 in an engaged position during specified operating conditions such that the slider face 232 may maintain a suitable distance from the rotor face 234 to provide an aspirating face seal, a fluid bearing, a gas bearing, or the like. For example, the secondary seal 242 may maintain the seal slider 226 in an engaged position during variable operating conditions that fall within a working range of variation. Additionally, or in the alternative, the secondary seal 242 may retract the seal slider to a retracted position, and/or may maintain the seal slider 226 in a retracted position, during operating conditions that fall outside of the working range of variation. Operating conditions may be within the working range of variation during at least one of: startup operating conditions, idle operating conditions, shutdown operating conditions, transient operating conditions, and aberrant operating conditions. Operating conditions may fall outside of the working range of variation during at least one of: startup operating conditions, idle operating conditions, shutdown operating conditions, transient operating conditions, and aberrant operating conditions.

Exemplary seal assemblies 202 may include the primary seal 230 that has one or more primary sealing elements 244. Additionally, or in the alternative, exemplary seal assemblies 202 may include a secondary seal 242 that has one or more secondary sealing elements 246. The secondary sealing element(s) 246 may be coupled to the seal stator 224 and/or to the seal slider 226. In some embodiments, a rotor-facing portion of a secondary sealing element 246 may be coupled to the seal stator 224.

Additionally, or in the alternative, a stator-facing portion of a secondary sealing element 246 may be coupled to the seal slider 226. In some embodiments, a stator-facing portion of a secondary sealing element 246 may be coupled to the seal stator 224. Additionally, or in the alternative, a rotor-facing portion of a secondary sealing element 246 may be coupled to the seal slider 226. The one or more primary sealing elements 244 and/or the one or more secondary sealing elements 246 may be engaged and/or disengaged depending at least in part on a position of the seal slider 226 relative to the seal rotor 222 and/or the seal stator 224. During operation, engagement and/or disengagement of the one or more primary sealing elements 244 and/or the one or more secondary sealing elements 246 may depend at least in part on one or more forces acting upon the secondary seal 242. Additionally, or in the alternative, in some embodiments, exemplary seal assemblies 202 may include a tertiary seal that has one or more tertiary sealing elements. The one or more tertiary sealing elements may be engaged and/or disengaged depending at least in part on a position of the seal slider 226 relative to the seal rotor 222 and/or the seal stator 224, for example, responsive to on one or more forces acting upon the secondary seal 242.

Figure 3:
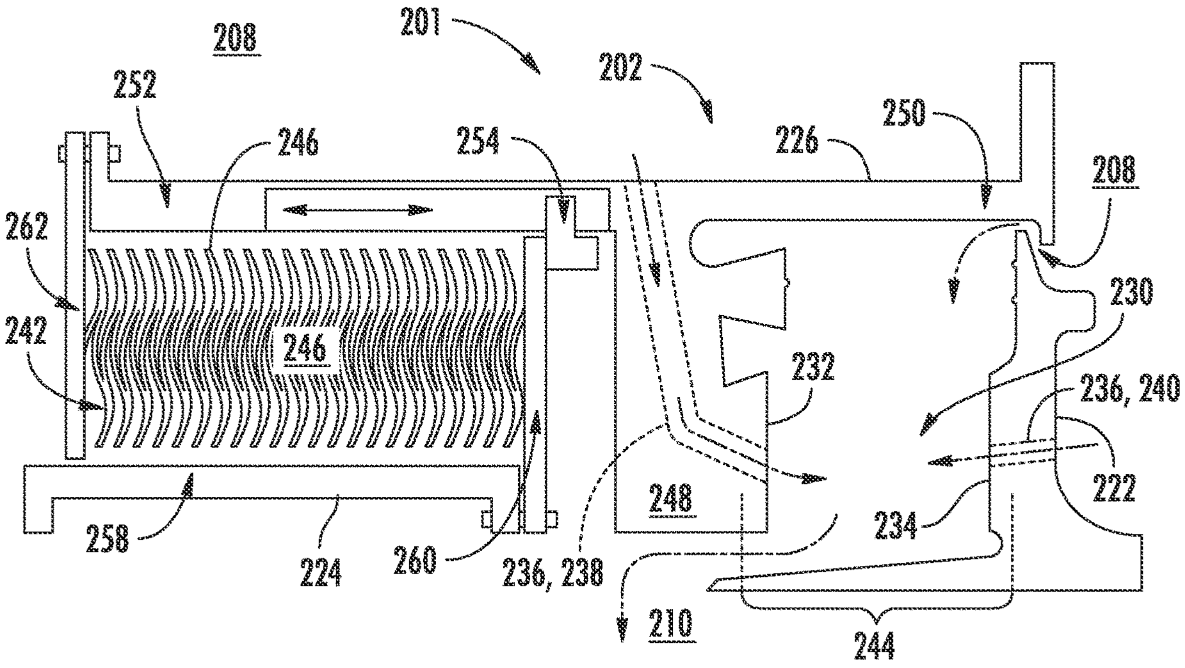
FIG. 3 shows a schematic side view of an exemplary seal assembly according to embodiments of the present disclosure.

Referring now to FIG. 3, the seal slider 226 may include a primary seal body 248. The primary seal body 248 may include one or more slider faces 232. The one or more slider faces 232 may respectively interface with a one or more corresponding rotor faces 234, define a primary seal 230 and/or a one or more corresponding primary sealing elements 244. In some embodiments, the primary seal body 248 may define a plurality of slider-aspiration conduits 238. The seal slider 226 may include a rotor-facing extension 250 that projects axially towards the seal rotor 222. The rotor-facing extension 250 may axially overlap at last a portion of the seal rotor 222 over at least a portion of the range of motion of the seal slider 226. The rotor-facing extension 250 and the primary seal body 248 may define respective portions of a single component, such as a monolithic component, or the rotor-facing extension 250 and the primary seal body 248 may be coupled to one another. The seal slider 226 may include a stator-facing extension 252 that projects axially towards the seal stator 224. The stator-facing extension 252 may axially overlap the seal stator 224 over at least a portion of the range of motion of the seal slider 226. The stator-facing extension 252 and the primary seal body 248 may define respective portions of a single component, such as a monolithic component, or the stator-facing extension 252 and the primary seal body 248 may be coupled to one another. In some embodiments, the seal stator 224 may be coupled to the seal slider 226 directly or indirectly at the stator-facing extension 252. Additionally, or in the alternative, the seal stator 224 may be coupled to the seal slider 226 directly or indirectly at the primary seal body 248. In some embodiments, the secondary seal 242 may be directly or indirectly coupled to the seal slider 226. For example, the secondary seal 242 may be coupled to the seal slider 226 directly or indirectly at the stator-facing extension 252 and/or directly or indirectly at the primary seal body 248. Additionally, or in the alternative, in some embodiments, the secondary seal 242 may be directly or indirectly coupled to the seal stator 224.

In some embodiments, the seal stator 224 may include a stator flange 258 and a slider flange 260. The stator flange 258 may be coupled to or defined by a stator 206 of the rotary machine 200, such as a turbine center frame 214 (FIG. 2A). Additionally, or in the alternative, the stator flange 258 may be coupled to or defined by the rotor 204 of the rotary machine 200, such as to the HP spool cone 212 and/or an inner extension 220 (FIG. 2B). The slider flange 260 may be configured to interface with the seal slider 226. For example, the slider pin(s) 254 may be defined by or coupled to the slider flange 260. The slider flange 260 may be coupled to the stator flange 258, or the slider flange 260 and the stator flange 258 may define respective portions of a single component, such as a monolithic component.

In some embodiments, the seal slider 226 may include a secondary seal flange 262. The secondary seal flange 262 may be coupled to the seal slider 226, such as to the stator-facing extension 252 of the seal slider 226. Alternatively, the secondary seal flange 262 may define a portion of the seal slider 226, such as a portion of the stator-facing extension 252. For example, the seal slider 226 and the secondary seal flange 262 may define respective portions of a single component, such as a monolithic component.

As shown, for example, in FIG. 3, the secondary seal 242 may be disposed between the seal stator 224 and the seal slider 226. In some embodiments, the secondary seal 242 may be coupled to the seal stator 224. For example, the secondary seal 242, such as a rotor-facing portion of the secondary seal 242, may be coupled to the slider flange 260 of the seal stator 224. Additionally, or in the alternative, the secondary seal 242 may be coupled to the seal slider 226.

For example, the secondary seal 242, such as a stator-facing portion of the secondary seal 242, may be coupled to the secondary seal flange 262 of the seal slider 226. As described herein, the secondary seal 242 may be configured to exhibit forward and aft displacement and/or compression and rebound, such as under a compression load and/or a tension load, suitable for operation of the primary seal 230, such as under specified operating conditions of the rotary machine 200. The secondary seal 242 and/or one or more secondary sealing elements 246 thereof may be configured to inhibit or prevent fluid flow through the secondary seal 242, such as from the inlet plenum 208 to the outlet plenum 210.

In some embodiments, the secondary seal 242 and/or one or more secondary sealing elements 246 thereof may be impermeable to fluid. Additionally, or in the alternative, the secondary seal 242 and/or one or more secondary sealing elements 246 thereof may provide a fluid-tight seal, for example, at an interface with a portion of the seal slider 226, such as the secondary seal flange 262, and/or at an interface with a portion of the seal stator 224, such as the slider flange 260. For example, the secondary seal 242 and/or the secondary sealing element(s) 246 may be coupled to the seal slider 226, such as to the secondary seal flange 262, for example, at a stator-facing portion of the secondary seal 242 and/or the one or more secondary sealing elements 246. Additionally, or in the alternative, the secondary seal 242 and/or the secondary sealing element(s) 246 may be coupled to the seal stator 224, such as to the slider flange 260, for example, at a rotor-facing portion of the secondary seal 242 and/or the secondary sealing element(s) 246. The secondary seal 242 and/or the secondary sealing element(s) 246 may be coupled to the seal stator 224 and/or to the seal slider 226 by way of welding, brazing, attachment hardware, or the like. Additionally, or in the alternative, the secondary seal 242 and/or the secondary sealing element(s) 246 may be seated in groove or the like defined by the seal slider 226 (such as by the secondary seal flange 262) that provides a fluid-tight seal therebetween. Additionally, or in the alternative, the secondary seal 242 and/or the secondary sealing element(s) 246 may be seated in groove or the like defined by the seal stator 224 (such as by the slider flange 260) that provides a fluid-tight seal therebetween. In some embodiments, the secondary seal 242 and/or secondary sealing element(s) 246 thereof may be permeable to fluid, while suitably inhibiting fluid flow therethrough, such as from the inlet plenum 208 to the outlet plenum 210.

Figure 4:
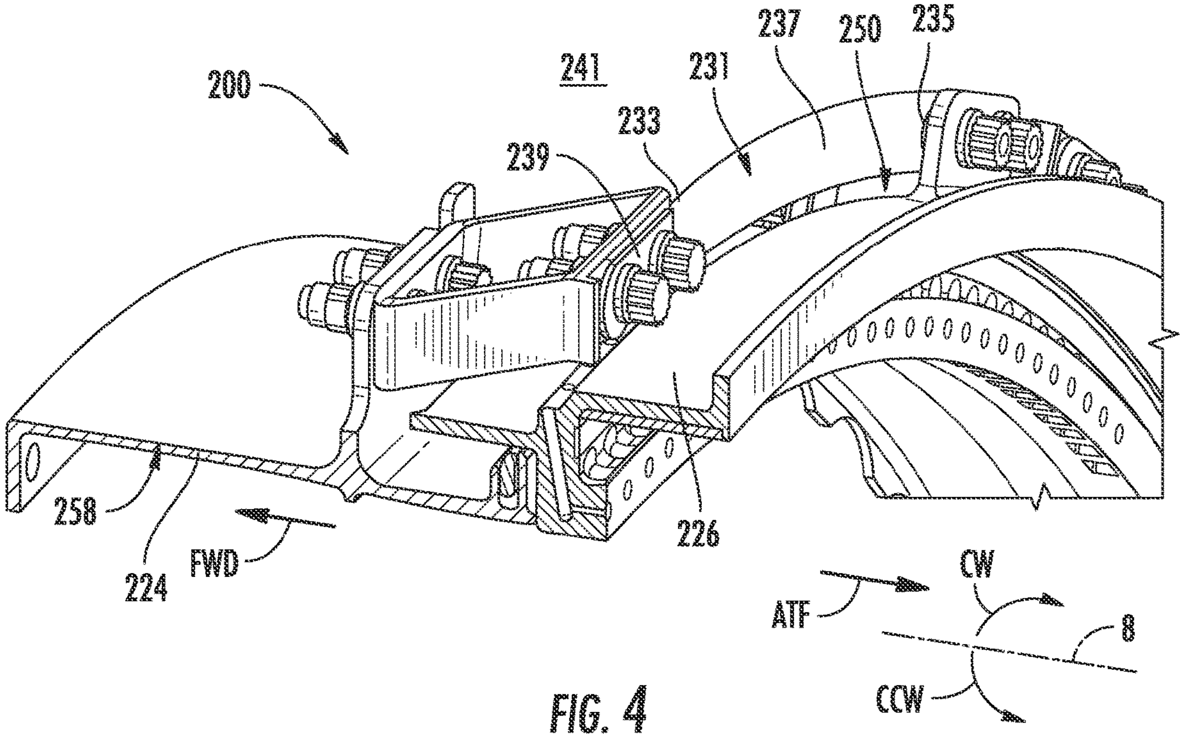
FIG. 4 is a cut-away perspective view illustration of an embodiment of an aspirating gas bearing face seal having a retraction leaf spring according to the present disclosure.
Figure 5:
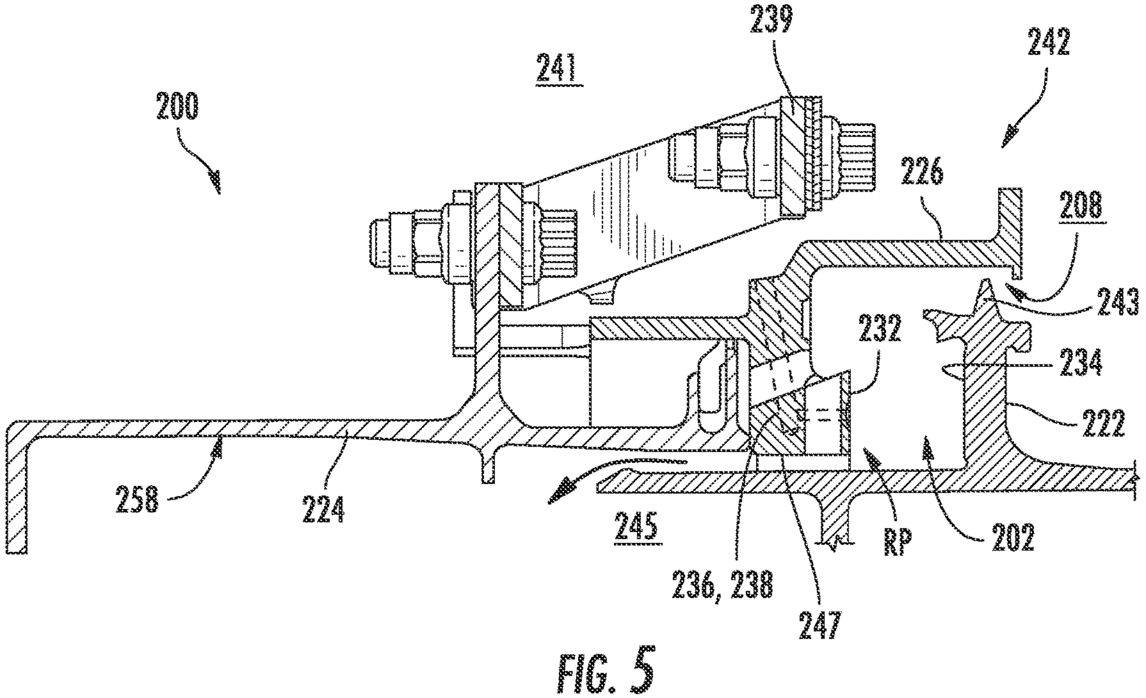
FIG. 5 is a cross-sectional view illustration of a first circumferential end of the leaf spring bolted to a stator portion of the aspirating gas bearing face seal illustrated in FIG. 4.

Referring now to FIGS. 4 and 5, another embodiment of the secondary seal 242 for retracting the seal slider 226 away from the seal rotor 222 is illustrated. During low or no power conditions, the seal slider 226 and the slider face 232 are biased away from the slider face 232 or the rotating seal surface on the seal rotor 222 by the secondary seal 242. This causes the gas bearing space to axially lengthen.

Moreover, as shown, the secondary seal 242 includes a plurality of circumferentially spaced apart non-coiled leaf springs 231 disposed between and around the seal stator 224 and the seal slider 226. As shown particularly in FIG. 4, each of the non-coiled leaf springs 231 includes first and second ends 233, 235 and a middle portion 237 therebetween. In an embodiment, as shown, the first end 233 is mounted by a bracket 239 mounted on or attached to the seal stator 224. The second end 235 is mounted on or attached to the seal slider 226. In particular, as shown, bolts and nuts may be used to secure or attach the first and second ends 233, 235.

The non-coiled leaf springs 231 are oriented to be compliant in the axial direction while being stiff in the radial and circumferential directions. The slider's freedom of motion is equivalent to the current art, but it does not require a sliding interface, which reduces wear. As such, the secondary seal 242 with the non-coiled leaf springs 231 reduces part count, eliminates coatings on wear surfaces, reduces machining operations, and lowers manufacturing and repair costs. Furthermore, the secondary seal 242 with the non-coiled leaf springs 231 eliminates features that require tight tolerances and, thus, result in reduced manufacturing and repair costs. Thus, the secondary seal 242 with the non-coiled springs 231 simplifies the assembly process because less shimming is required.

Referring particularly to FIG. 5, as the engine is started, the pressure in the high pressure region 241 begins to rise because the starter seal tooth 243 restricts the air flowing from the relatively high pressure region 241 to the relatively low pressure region 245. The pressure differential between the low and high pressure regions 241, 245 results in a closing pressure force acting on central ring 247. The pressure force acts against a spring force from the secondary seal 242 to push the central ring 247 and the slider face 232 mounted thereupon towards the rotor face 234. During shutdown of the engine, pressure in the high pressure region 241 drops off and the non-coiled leaf springs 231 of the secondary seal 242 overcome the closing force and retract the aspirating face seal. Many styles and configurations of the leaf springs 231 may be used.

Figure 6A:
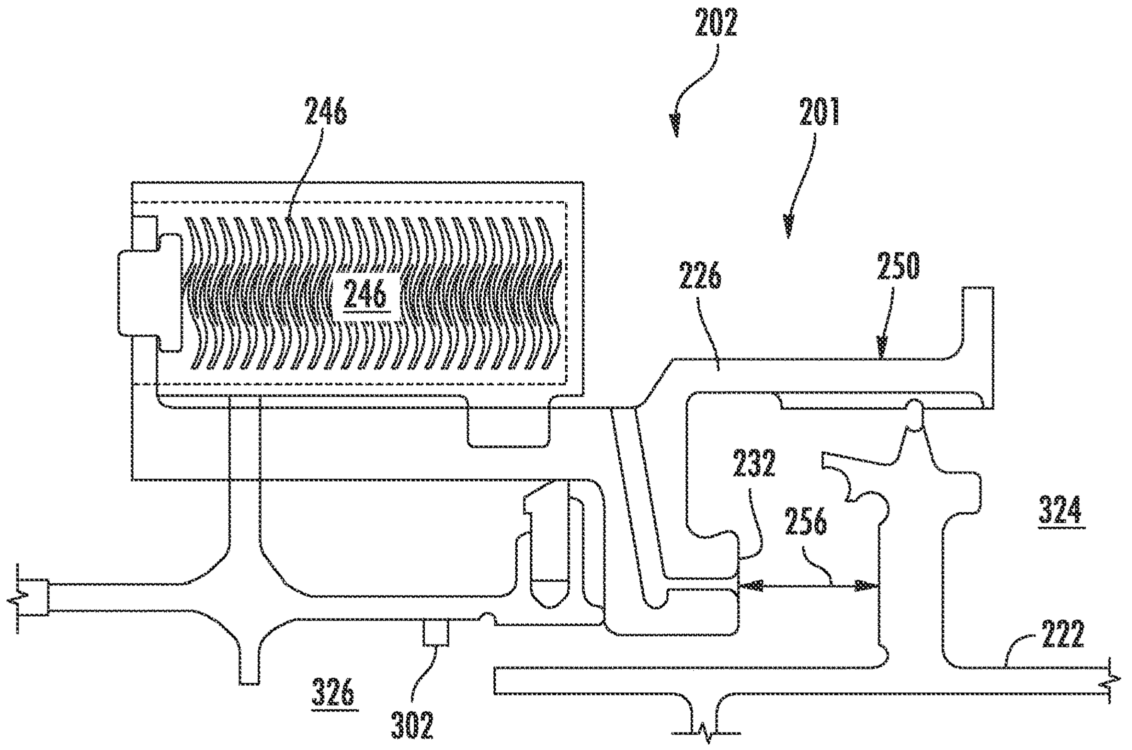
FIG. 6A shows a schematic perspective view of an exemplary seal assembly of a turbine engine according to an embodiment of the present disclosure, particularly illustrating a clearance at the rotor-stator interface being open.
Figure 6B:
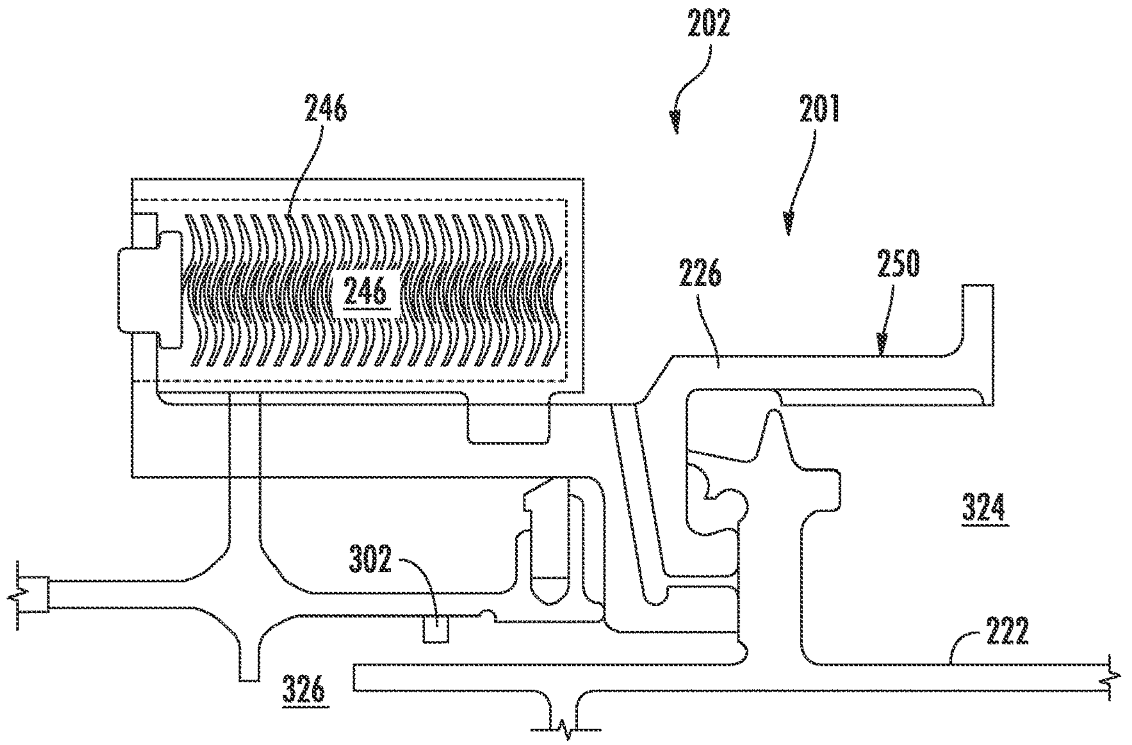
FIG. 6B shows a schematic perspective view of an exemplary seal assembly of a turbine engine in an operational state according to an embodiment of the present disclosure, particularly illustrating a clearance at the rotor-stator interface being closed such that contact occurs between a seal rotor and seal slider during operation.

Referring now to FIGS. 6A-13C, various views of additional components of the seal assembly 202 according to the present disclosure are illustrated. As mentioned, the seal assembly 202 may be located at any suitable location within the rotary machine 200. Thus, the seal assembly 202 may include a non-contacting seal interface that is configured as an aspirating face seal, a fluid bearing, a gas bearing, or the like, as well as a radial or axial carbon seal, a radial or axial film riding seal, or the like, so as to inhibit contact between the seal stator 224 and the seal slider 226. Moreover, as generally shown in FIGS. 7-13C, the seal assembly 202 includes at least one rub detection feature 300. Thus, the rub detection feature(s) 300, by becoming exposed, is configured to generate a signal upon the seal rotor 222 and the seal slider 226 making contact at the rotor-stator interface 201 and causing wear above a certain threshold at the rotor-stator interface 201. In particular, as shown in FIGS. 6A and 6B, schematic perspective views of the seal assembly 202 according to an embodiment of the present disclosure are illustrated. More specifically, FIG. 6A illustrates a clearance 256 at the rotor-stator interface 201 being open. In contrast, as shown in FIG. 6B, the clearance 256 at the rotor-stator interface 201 is closed such that contact occurs between the seal rotor 222 and the seal slider 226 during operation and causes wear. Thus, in an embodiment, after a certain wear depth is generated on the rotor face 234, a signal can be generated by the rub detection feature(s) 300 becoming exposed.

Figure 10:
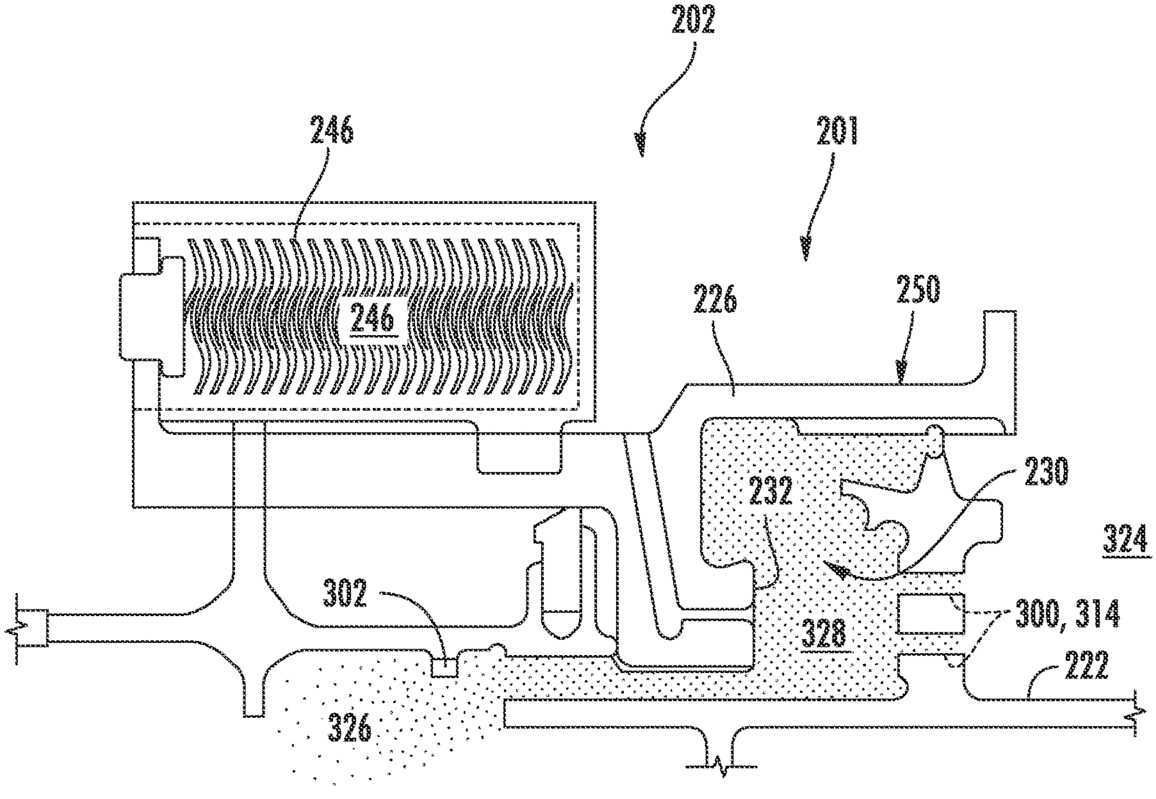
FIG. 10 shows a detailed, side view of an exemplary seal assembly according to the present disclosure, particularly illustrating a rotor face of the seal assembly having a plurality of blind holes formed therein and being exposed due to wear caused by air bearing rubs according to embodiments of the present disclosure.
Figure 14:
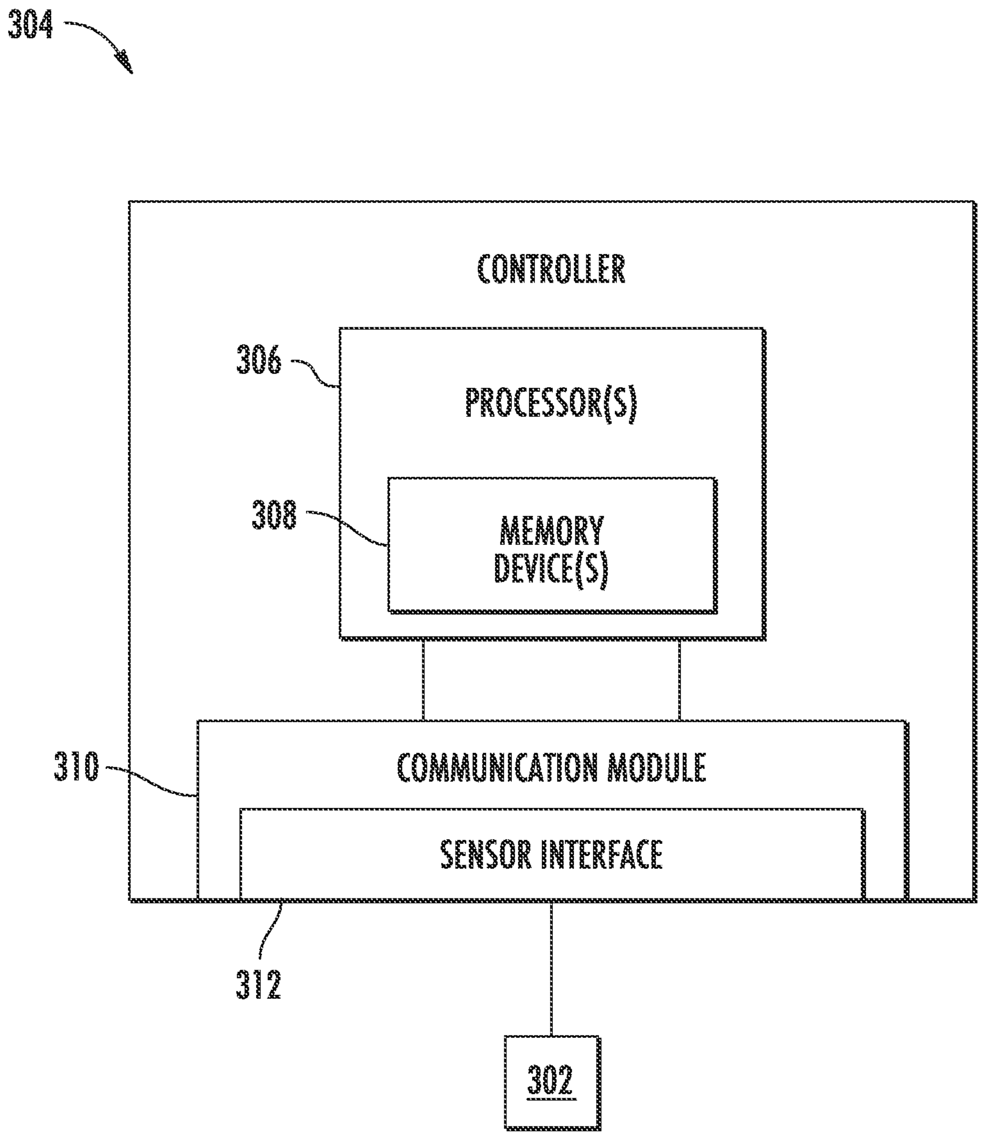
FIG. 14 shows a block diagram of an embodiment of a controller according to the present disclosure.

Furthermore, as shown particularly in FIGS. 8, 10, and 14, the seal assembly 202 may further include at least one sensor 302 arranged at the rotor-stator interface 201. Thus, the sensor(s) 302 is configured to sense the signal generated by the rub detection feature(s) 300. Thus, as shown in FIG. 14, the seal assembly 202 may further includes a controller 304 communicatively coupled with the sensor(s) 302. Accordingly, the controller 304 is configured to receive the signal and estimate an amount and/or a location of the wear at the rotor-stator interface 201 based on the signal (e.g., because the signal changes as the rub detection feature(s) 300 becoming exposed).

Referring particularly to FIG. 14, a block diagram of one embodiment of suitable components that may be included within the controller 304 in accordance with example aspects of the present disclosure is illustrated. As shown, the controller 304 may include one or more processor(s) 306, computer, or other suitable processing unit and associated memory device(s) 308 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 308 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 308 may generally be configured to store suitable computer-readable instructions that, when implemented by the processor(s) 306, configure the controller to perform various functions as described herein. Additionally, the controller 304 may also include a communications interface 310 to facilitate communications between the controller 304 and the various components of the seal assembly 202. An interface can include one or more circuits, terminals, pins, contacts, conductors, or other components for sending and receiving control signals. Moreover, the controller 304 may include a sensor interface 312 (e.g., one or more analog-to-digital converters) to permit signals transmitted from the sensor(s) 302 to be converted into signals that can be understood and processed by the processor(s) 306.

Referring back to FIGS. 6A-13C, various embodiments of the rub detection feature(s) 300 of the seal assembly 202 according to the present disclosure is illustrated. In particular, as shown in FIGS. 6A-13C, the rub detection feature(s) 300 is integral with the rotor face 234 of the rotor 204. More specifically, as shown in FIGS. 6A-13C, the rub detection feature(s) 300 include at least one blind hole 314 extending partially through a thickness 320 of the rotor face 234 such that a seal-side 322 of the blind hole(s) 314 is covered during non-contacting conditions. In particular, as shown, the seal assembly 202 may include a plurality of blind holes 314 extending partially through the thickness 320 of the rotor face 234. Thus, upon the seal rotor 222 and the seal slider 226 making contact at the rotor-stator interface 201 and causing wear above the certain threshold at the rotor-stator interface 201, the seal-side 322 of one or more of the blind hole(s) 314 becomes exposed so as to generate the signal that is indicative of wear.

Figure 12:
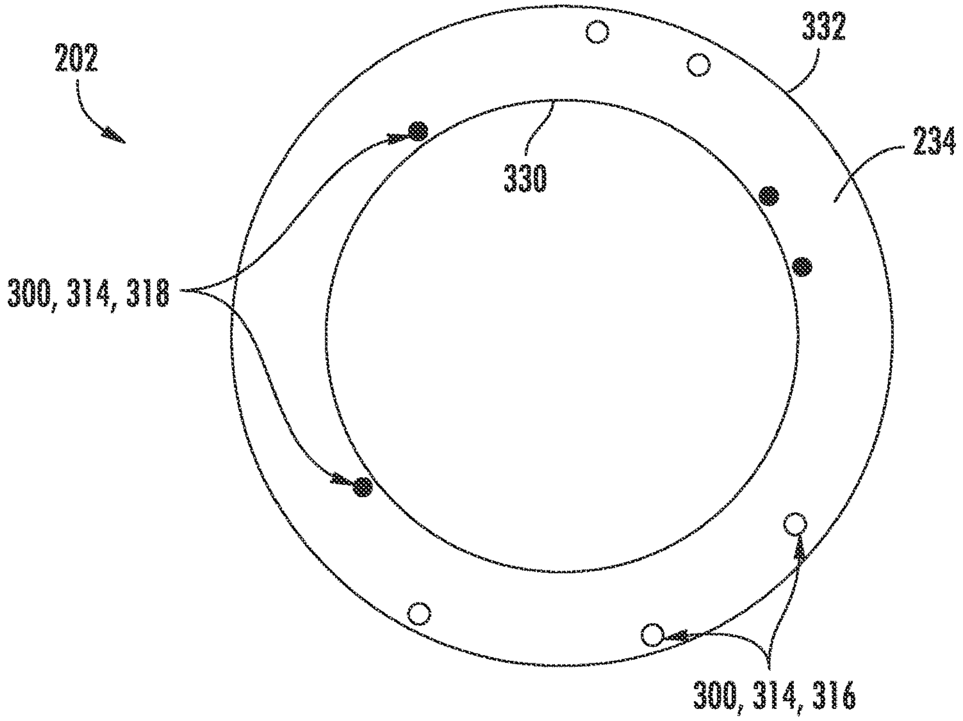
FIG. 12 shows a front view of an exemplary rotor face of a seal assembly according to the present disclosure, particularly illustrating a plurality of blind holes formed therein according to embodiments of the present disclosure.

More particularly, in an embodiment, as shown in FIG. 12, the plurality of blind holes 314 may be circumferentially spaced about the rotor face 234 at different inner and outer diameter locations to produce different signals for different areas of the wear at the rotor-stator interface 201. For example, in FIG. 12, blind holes 314 located closer to an outer diameter 332 of the rotor face 234 are labeled as outer diameter blind holes 316, whereas blind holes 314 located closer to an inner diameter 330 of the rotor face 234 are labeled as inner diameter blind holes 318.

Figure 7:
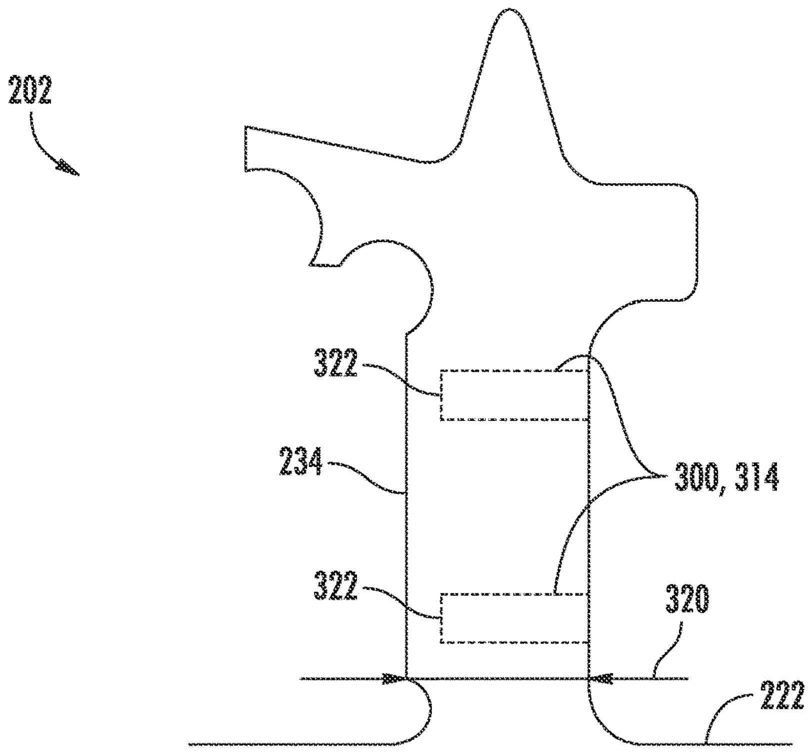
FIG. 7 shows a detailed, side view of an exemplary rotor face of a seal assembly according to the present disclosure, particularly illustrating a plurality of blind holes formed therein during normal conditions according to embodiments of the present disclosure.
Figure 9:
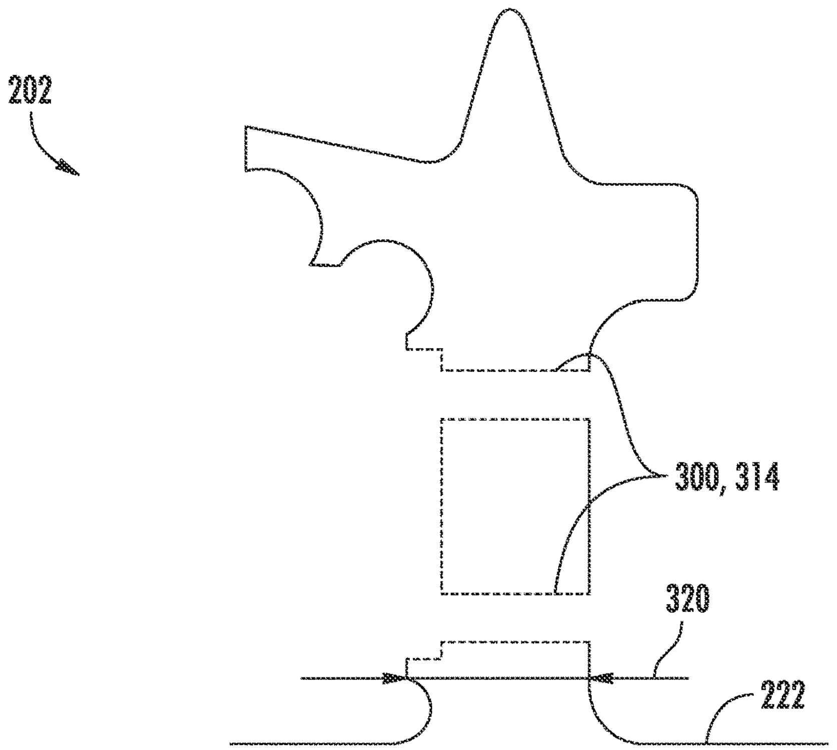
FIG. 9 shows a detailed, side view of an exemplary rotor face of a seal assembly according to the present disclosure, particularly illustrating a plurality of blind holes formed therein and being exposed due to air bearing wear caused due to rotor-stator rubs according to embodiments of the present disclosure.
Figure 13A:
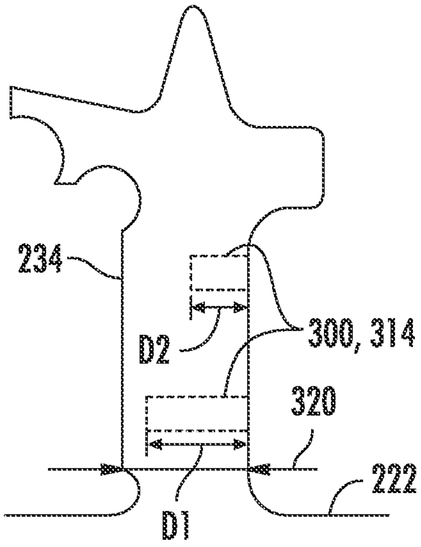
FIG. 13A shows a detailed, side view of an exemplary rotor face of a seal assembly according to the present disclosure, particularly illustrating a plurality of blind holes formed therein and having different depths according to embodiments of the present disclosure.

Moreover, in an embodiment, as shown in FIGS. 7 and 9, the blind holes 314 may have uniform depths (i.e., the depths of all blind holes 314 may be equal). In further embodiments, as shown in FIGS. 13A and 13B, the blind holes 314 may have varying depths (e.g., N1 holes may have a first depth D1 and N2 holes may have a different, second depth D2). Thus, in such embodiments, a wear condition in which the rotor thickness 320 minus the rotor wear (e.g., W0, W1, or W2) is greater than or equal to the first depth D1 produces a first frequency signal (e.g., N1 X1/rev). For further wear, e.g., when the rotor thickness 320 minus the rotor wear (e.g., W0, W1, or W2) is greater than or equal to the second depth produces a different, second frequency signal (e.g., N2 X1/rev). Thus, the differing depths of the blind holes 314 are configured to produce signals of differing frequency content for different levels of the wear at the rotor-stator interface 201. In yet another embodiment, as shown in FIGS. 7 and 9, the blind holes 314 may have a uniform cross-sectional shape, such as a cylindrical shape.

Figure 11:
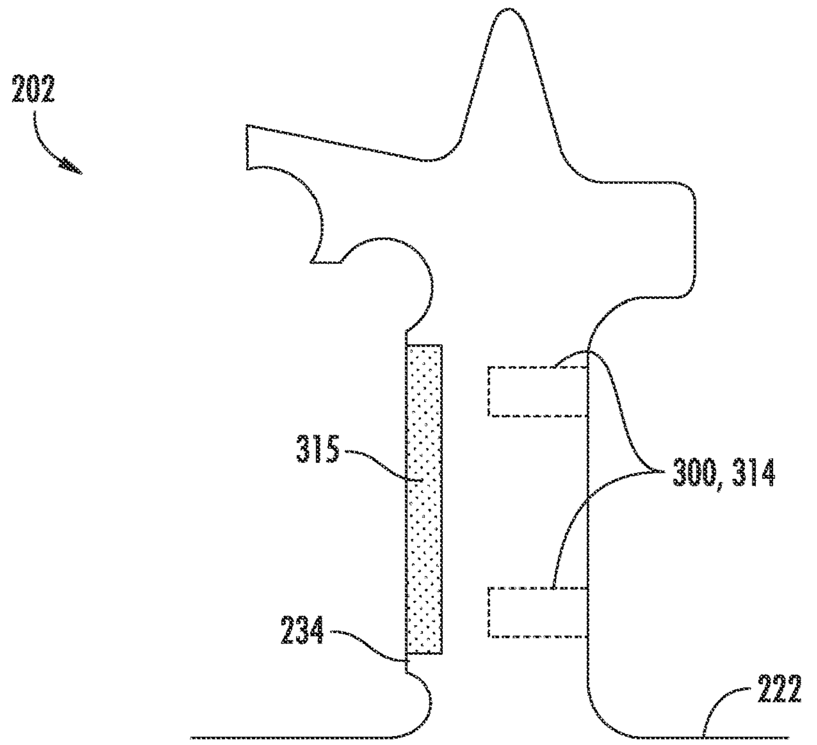
FIG. 11 illustrates shows a detailed, side view of an exemplary rotor face of a seal assembly according to the present disclosure, particularly illustrating the rotor face having a coating and a plurality of blind holes formed therein according to embodiments of the present disclosure.
Figure 13C:
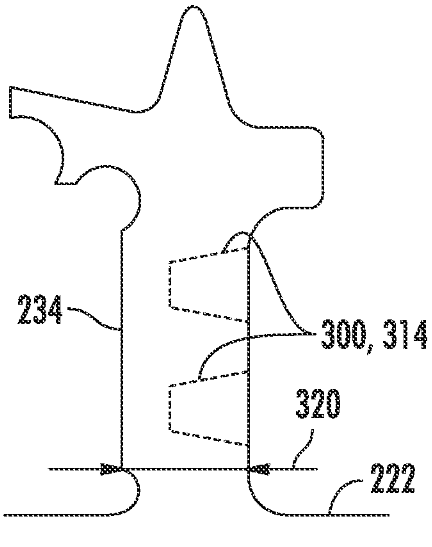
FIG. 13C shows a detailed, side view of an exemplary rotor face of a seal assembly according to the present disclosure, particularly illustrating a plurality of blind holes formed therein and having conical shapes according to embodiments of the present disclosure.
Figure 13B:
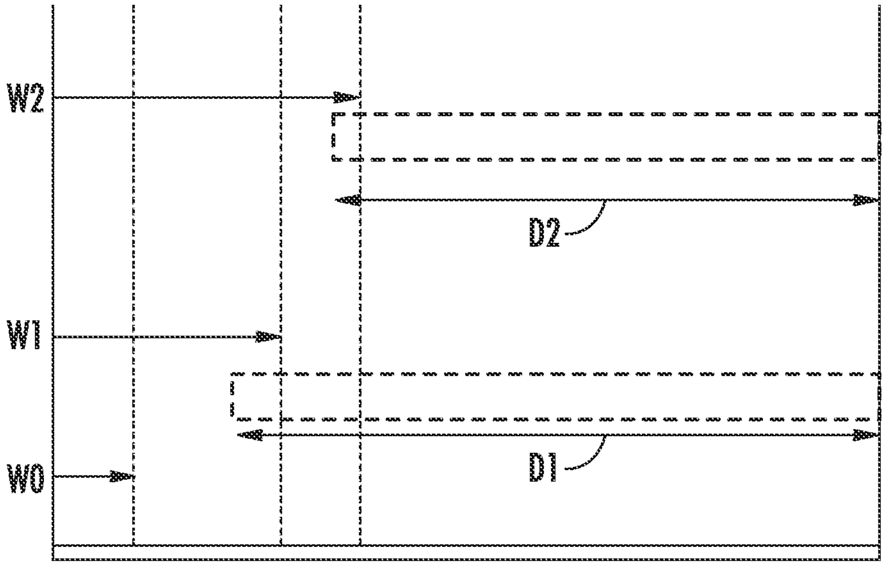
FIG. 13B illustrates a partial, schematic diagram of an exemplary rotor face of a seal assembly according to the present disclosure, particularly illustrating a plurality of blind holes formed therein and having different depths and wear values according to embodiments of the present disclosure.

In alternative embodiments, as shown in FIG. 13C, one or more of the plurality of blind holes 314 may have a conical shape such that a magnitude of the signal changes as the wear increases. In still another embodiment, as shown in FIG. 11, the rotor face 234 of the seal rotor 222 may include a wear-resistant coating 315.

Referring now to FIGS. 8 and 10, cross-sectional views of the seal assembly 202 during normal conditions (FIG. 8) and rub conditions (FIG. 10) are illustrated in accordance with embodiments of the present disclosure. Accordingly, in an embodiment, as shown, the rub conditions cause one or more of the blind holes 314 to become exposed, thereby causing the blind hole(s) 314 to connect an upstream high pressure area 324 with a downstream low pressure cavity 326. In such embodiments, as shown in FIGS. 8 and 10, the sensor(s) 302 may be a pressure sensor arranged in the downstream low pressure cavity 326 of the seal stator 224. Thus, in an embodiment, the signal generated by the exposed blind hole(s) 314 may be a pressure signal in a discharge flow of the non-contacting seal interface. This change in pressure can be monitored for example, during operation of the turbine engine 100.

Figure 15:
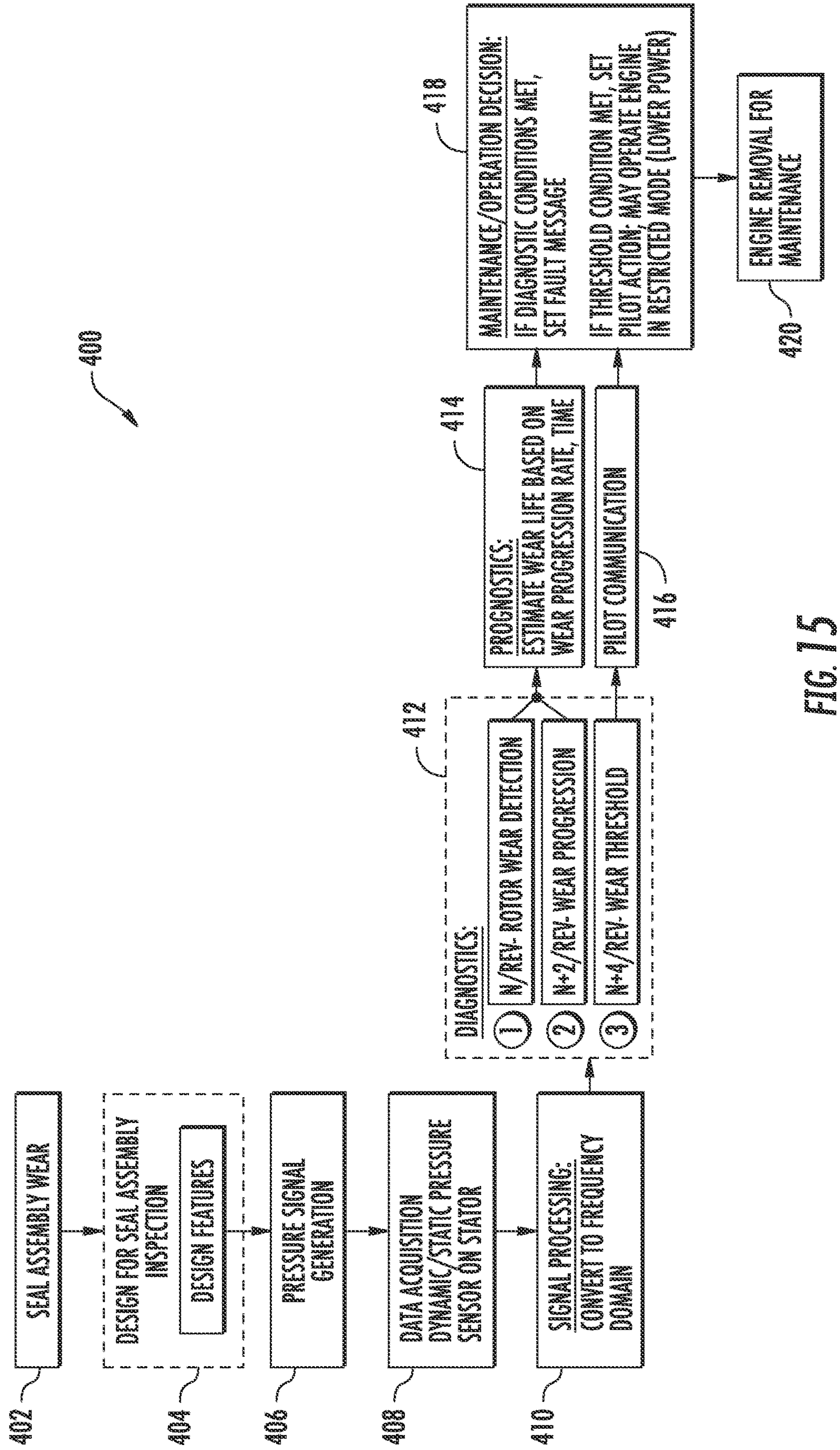
FIG. 15 shows a block diagram of an embodiment of a method of detecting wear of a seal assembly of a rotary machine according to the present disclosure.

Accordingly, FIG. 15 illustrates a flow diagram of an embodiment of a method 400 of detecting and/or minimizing wear of a seal assembly of a rotary machine, such as the seal assembly 202, according to the present disclosure. It should be appreciated that the disclosed method 400 may be implemented with any suitable seal assembly having any suitable configuration. In several embodiments, for example, the seal assembly 202 may be configured as an aspirating face seal, a fluid bearing, a gas bearing, or the like. In addition, or in the alternative, the primary seal may be configured as a radial film riding seal, an axial film riding seal, a radial carbon seal, an axial carbon seal, or the like. In addition, although FIG. 15 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 is configured to detect seal assembly wear, such as rotor air bearing wear. In particular, as shown at (404), the seal assembly 202 of the turbine engine 100 can be designed for easy seal assembly inspection. In addition, as shown, the seal assembly 202 includes one or more rub detection features 300 that help with identifying the presence of wear. Thus, as shown at (406), the rub detection feature(s) 300 are configured to generate a signal upon the seal rotor 222 and the seal slider 226 making contact at the rotor-stator interface 201 and causing wear above a certain threshold at the rotor-stator interface 201. Accordingly, the method 400 includes monitoring the signal. In particular, as shown at (408) and (410), the method 400 further includes data acquisition and signal processing steps. Thus, in such embodiments, the method 400 may include collecting data from one or more dynamic/static pressure sensors on the seal slider 226 and converting the collected data into a frequency domain for further analysis.

Figure 16:
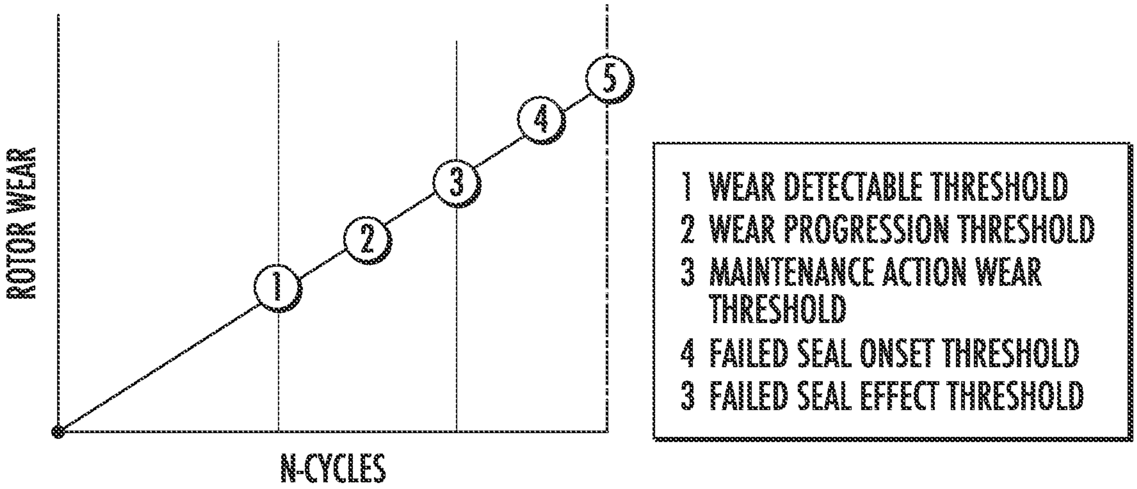
FIG. 16 shows a graph representation of an embodiment of example wear thresholds according to the present disclosure.

Still referring to FIG. 15, as shown at (412), the method 400 includes applying certain diagnostics to the converted signal(s). In particular, as shown, the controller 304 may be configured to process the signal and compare the processed signal to a plurality of different thresholds to estimate the amount and/or the location of the wear at the rotor-stator interface 201. In such embodiments, as shown in FIG. 16, the plurality of different thresholds may include a (1) wear detection threshold, (2) a wear progression threshold, (3) a maintenance action wear threshold, (4) a failed seal onset threshold, and/or (5) a failed seal effect threshold.

Accordingly, as shown at (414), the method 400 includes estimating, via the controller 304, at least one of an amount and a location of the wear at the rotor-stator interface 201 based on the signal. Thus, in an embodiment, the method 400 includes implementing, via the controller 304, a preventative action based on the amount and the location of the wear at the rotor-stator interface 201. In particular, as shown at (416), the controller 304 may be configured to communicate the amount and/or the location of the wear at the rotor-stator interface 201 to a user interface for display, such as to a pilot of an aircraft containing the turbine engine 100. Accordingly, as shown at (418), the method 400 may include determining a maintenance/operation decision. In particular, as shown, if certain of the diagnostic decisions at (412) are met, a fault message may be generated. In addition, as shown, if certain of the threshold conditions at (412) are met, the turbine engine 100 may be operated in a restricted/lower power mode and/or a pilot can take action. Moreover, as shown at (420), the method 400 may include removing the turbine engine 100 for maintenance if the wear is severe enough (e.g., greater than (3) the maintenance action wear threshold)

Further aspects of the presently disclosed subject matter are provided by the following clauses:

Clause 1. A rotary machine, comprising:

a stator;

a rotor configured to rotate with respect to the stator, the rotor being arranged with the stator at a rotor-stator interface;

a seal assembly at the rotor-stator interface, the seal assembly comprising at least one non-contacting seal interface and at least one rub detection feature, the at least one rub detection feature configured to generate a signal upon the rotor and the stator making contact at the rotor-stator interface and causing wear above a certain threshold at the rotor-stator interface;

at least one sensor arranged at the rotor-stator interface, the at least one sensor configured to sense the signal; and a controller communicatively coupled with the at least one sensor, the controller configured to receive the signal and estimate at least one of an amount and a location of the wear at the rotor-stator interface based on the signal.

Clause 2. The rotary machine of clause 1, wherein the seal assembly is configured as at least one of an aspirating face seal, a fluid bearing, a gas bearing, a film riding seal, or a carbon seal.

Clause 3. The rotary machine of any of the preceding clauses, wherein the at least one rub detection feature is integral with a rotor face of the rotor.

Clause 4. The rotary machine of any of the preceding clauses, wherein the at least one rub detection feature comprises at least one blind hole extending partially through a thickness of the rotor face such that a seal-side of the at least one blind hole is covered during non-contacting conditions, and wherein, upon the rotor and the stator making the contact at the rotor-stator interface and causing wear above the certain threshold at the rotor-stator interface, the seal-side of the at least one blind hole becomes exposed so as to generate the signal.

Clause 5. The rotary machine of any of the preceding clauses, wherein the at least one sensor comprises a pressure sensor arranged in a low-pressure cavity of the stator, and wherein the signal is a pressure signal in a discharge flow of the at least one non-contacting seal interface.

Clause 6. The rotary machine of any of the preceding clauses, wherein the signal is a frequency signal of a seal cavity of the seal assembly, and wherein a change in the frequency signal is used to determine whether the wear at the rotor-stator interface exceeds the certain threshold.

Clause 7. The rotary machine of any of the preceding clauses, wherein the at least one blind hole is one of a plurality of blind holes extending partially through the thickness of the rotor face.

Clause 8. The rotary machine of any of the preceding clauses, wherein the plurality of blind holes are circumferentially spaced about the rotor face at different inner and outer diameter locations to produce different signals for different areas of the wear at the rotor-stator interface.

Clause 9. The rotary machine of any of the preceding clauses, wherein the plurality of blind holes comprise varying depths to produce signals of differing frequency content for different levels of the wear at the rotor-stator interface.

Clause 10. The rotary machine of any of the preceding clauses, wherein one or more of the plurality of blind holes have a conical shape such that a magnitude of the signal changes as the wear increases.

Clause 11. The rotary machine of any of the preceding clauses, wherein the controller is further configured to process the signal and compare the processed signal to a plurality of different thresholds to estimate at least one of the amount and the location of the wear at the rotor-stator interface, the certain threshold being one of the plurality of different thresholds.

Clause 12. The rotary machine of any of the preceding clauses, wherein the plurality of different thresholds comprise at least two of the following: a wear detection threshold, a wear progression threshold, a maintenance action wear threshold, a failed seal onset threshold, and a failed seal effect threshold.

Clause 13. The rotary machine of any of the preceding clauses, wherein the controller is further configured to send at least one of the amount and the location of the wear at the rotor-stator interface to a user interface for display.

Clause 14. A method of detecting wear of a seal assembly of a rotary machine, the seal assembly having at least one non-contacting seal interface and at least one rub detection feature, the method comprising:

during operation of the rotary machine, generating, via the at least one rub detection feature, a signal upon a rotor and a stator of the rotary machine making contact at a rotor-stator interface and causing wear above a certain threshold at the rotor-stator interface;

sensing, via at least one sensor arranged at the rotor-stator interface, the signal;

estimating, via a controller communicatively coupled with the at least one sensor, at least one of an amount and a location of the wear at the rotor-stator interface based on the signal; and implementing, via the controller, a preventative action based on the amount and the location of the wear at the rotor-stator interface.

Clause 15. The method of any of the preceding clauses, wherein the at least one rub detection feature is integral with a rotor face of the rotor.

Clause 16. The method of any of the preceding clauses, wherein the at least one rub detection feature comprises at least one blind hole extending partially through a thickness of a rotor face of the rotor such that a seal-side of the at least one blind hole is covered during non-contacting conditions, and wherein, upon the rotor and the stator making the contact at the rotor-stator interface and causing wear above the certain threshold at the rotor-stator interface, the seal-side of the at least one blind hole becomes exposed so as to generate the signal.

Clause 17. The method of any of the preceding clauses, wherein the at least one sensor comprises a pressure sensor arranged in a low-pressure cavity of the stator, and wherein the signal is a pressure signal in a discharge flow of the at least one non-contacting seal interface.

Clause 18. The method of any of the preceding clauses, further comprising:

converting, via the controller, the signal to a frequency domain; and comparing the frequency domain to a plurality of different thresholds to estimate at least one of the amount and the location of the wear at the rotor-stator interface, the certain threshold being one of the plurality of different thresholds.

Clause 19. The method of any of the preceding clauses, wherein the plurality of different thresholds comprise at least two of the following: a wear detection threshold, a wear progression threshold, a minimum wear threshold, a failed seal onset threshold, and a failed seal effect threshold.

Clause 20. A system, comprising:

at least one rub detection feature formed into at least one of a rotor or a stator of a rotary machine at a non-contacting seal interface, the at least one rub detection feature configured to generate a signal upon the rotor and the stator making contact and causing wear above a certain threshold;

at least one sensor arranged at the non-contacting seal interface, the at least one sensor configured to sense the signal; and a controller communicatively coupled with the at least one sensor, the controller configured to receive the signal and estimate at least one of an amount and a location of the wear based on the signal.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A rotary machine, comprising:

a stator;

a rotor configured to rotate with respect to the stator, the rotor being arranged with the stator at a rotor-stator interface;

a seal assembly at the rotor-stator interface, the seal assembly comprising at least one non-contacting seal interface and at least one rub detection feature, wherein the at least one rub detection feature is integral with a rotor face of the rotor, the at least one rub detection feature configured to generate a signal upon the rotor and the stator making contact at the rotor-stator interface and causing wear above a certain threshold at the rotor-stator interface, wherein the at least one rub detection feature comprises at least one blind hole extending partially through a thickness of the rotor face such that a seal-side of the at least one blind hole is covered during non-contacting conditions, and wherein, upon the rotor and the stator making the contact at the rotor-stator interface and causing wear above the certain threshold at the rotor-stator interface, the seal-side of the at least one blind hole becomes exposed so as to generate the signal;

at least one sensor arranged at the rotor-stator interface, the at least one sensor configured to sense the signal, wherein the at least one sensor comprises a pressure sensor arranged in a low-pressure cavity of the stator, and wherein the signal is a pressure signal in a discharge flow of the at least one non-contacting seal interface; and a controller communicatively coupled with the at least one sensor, the controller configured to receive the signal and estimate at least one of an amount and a location of the wear at the rotor-stator interface based on the signal.

2. The rotary machine of claim 1, wherein the seal assembly is configured as at least one of an aspirating face seal, a fluid bearing, a gas bearing, a film riding seal, or a carbon seal.

3. The rotary machine of claim 1, wherein the at least one blind hole comprises a plurality of blind holes extending partially through the thickness of the rotor face.

4. The rotary machine of claim 3, wherein the plurality of blind holes are circumferentially spaced about the rotor face at different inner and outer diameter locations.

5. The rotary machine of claim 3, wherein the plurality of blind holes comprise varying depths.

6. The rotary machine of claim 3, wherein one or more of the plurality of blind holes have a conical shape.

7. The rotary machine of claim 1, wherein the controller is further configured to process the signal and compare the processed signal to a plurality of different thresholds to estimate at least one of the amount and the location of the wear at the rotor-stator interface, the certain threshold being one of the plurality of different thresholds.

8. The rotary machine of claim 7, wherein the plurality of different thresholds comprise at least two of the following: a wear detection threshold, a wear progression threshold, a maintenance action wear threshold, a failed seal onset threshold, and a failed seal effect threshold.

9. The rotary machine of claim 1, wherein the controller is further configured to send at least one of the amount and the location of the wear at the rotor-stator interface to a user interface for display.

10. A rotary machine, comprising:

a stator;

a rotor configured to rotate with respect to the stator, the rotor being arranged with the stator at a rotor-stator interface;

a seal assembly at the rotor-stator interface, the seal assembly comprising at least one non-contacting seal interface and at least one rub detection feature, wherein the at least one rub detection feature is integral with a rotor face of the rotor, the at least one rub detection feature configured to generate a signal upon the rotor and the stator making contact at the rotor-stator interface and causing wear above a certain threshold at the rotor-stator interface;

at least one sensor arranged at the rotor-stator interface, the at least one sensor configured to sense the signal, wherein the at least one rub detection feature comprises at least one blind hole extending partially through a thickness of the rotor face such that a seal-side of the at least one blind hole is covered during non-contacting conditions, and wherein, upon the rotor and the stator making the contact at the rotor-stator interface and causing wear above the certain threshold at the rotor-stator interface, the seal-side of the at least one blind hole becomes exposed so as to generate the signal, wherein the signal is a frequency signal of a seal cavity of the seal assembly, and wherein a change in the frequency signal is used to determine whether the wear at the rotor-stator interface exceeds the certain threshold; and a controller communicatively coupled with the at least one sensor, the controller configured to receive the signal and estimate at least one of an amount and a location of the wear at the rotor-stator interface based on the signal.

11. The rotary machine of claim 10, wherein the seal assembly is configured as at least one of an aspirating face seal, a fluid bearing, a gas bearing, a film riding seal, or a carbon seal.

12. The rotary machine of claim 10, wherein the at least one blind hole is one of a plurality of blind holes extending partially through the thickness of the rotor face.

13. The rotary machine of claim 12, wherein the plurality of blind holes are circumferentially spaced about the rotor face at different inner and outer diameter locations.

14. The rotary machine of claim 12, wherein the plurality of blind holes comprise varying depths.

15. The rotary machine of claim 12, wherein one or more of the plurality of blind holes have a conical shape.

16. The rotary machine of claim 10, wherein the controller is further configured to process the signal and compare the processed signal to a plurality of different thresholds to estimate at least one of the amount and the location of the wear at the rotor-stator interface, the certain threshold being one of the plurality of different thresholds.

17. The rotary machine of claim 16, wherein the plurality of different thresholds comprise at least two of the following: a wear detection threshold, a wear progression threshold, a maintenance action wear threshold, a failed seal onset threshold, and a failed seal effect threshold.

18. The rotary machine of claim 10, wherein the controller is further configured to send at least one of the amount and the location of the wear at the rotor-stator interface to a user interface for display.

* * * * *